(12) United States Patent
Miyazaki et al.

(10) Patent No.: US 7,079,198 B2
(45) Date of Patent: Jul. 18, 2006

(54) WIRING STRUCTURE, METHOD OF MANUFACTURING THE SAME, ELECTRO-OPTICAL DEVICE, AND ELECTRONIC DEVICE

(75) Inventors: Toshihide Miyazaki, Suwa (JP); Shin Oyamada, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 459 days.

(21) Appl. No.: 10/676,143

(22) Filed: Oct. 2, 2003

(65) Prior Publication Data
US 2004/0119899 A1    Jun. 24, 2004

(30) Foreign Application Priority Data
Nov. 26, 2002    (JP) .............................. 2002-342490

(51) Int. Cl.
*G02F 1/1343* (2006.01)
(52) U.S. Cl. .......................................... 349/38; 349/39
(58) Field of Classification Search .................. 349/38, 349/39, 138, 139, 43
See application file for complete search history.

(56) References Cited

U.S. PATENT DOCUMENTS 6,525,788 B1 *   2/2003   Nakagawa et al. ........... 349/44
6,812,975 B1 *   11/2004  Nagahiro ..................... 349/39
6,894,734 B1 *   5/2005   Ihara ............................ 349/38

FOREIGN PATENT DOCUMENTS

| JP | A-10-104660 | 4/1998 |
| JP | A 2001-305581 | 10/2001 |
| JP | A 2002-107745 | 4/2002 |
| JP | A 2002-122889 | 4/2002 |
| JP | A 2002-149089 | 5/2002 |

* cited by examiner

Primary Examiner—Andrew Schechter
Assistant Examiner—David Y. Chung
(74) Attorney, Agent, or Firm—Oliff & Berridge, PLC

(57) ABSTRACT

The invention provides a wiring structure and a method for manufacturing the same for appropriately establishing an electrical connection between a first conductive layer constituting a part of a laminate and a conductive layer to be electrically connected thereto. The wiring structure can include, on a substrate, a capacitor provided with a first conductive layer, an insulating layer formed on the first conductive layer, and a second conductive layer formed on the insulating layer, a conductive layer electrically connected to the first conductive layer, and a relay layer located below the first conductive layer and the conductive layer, respectively to form a part of laminated structure. The first conductive layer and the conductive layer are electrically connected to each other through the relay layer.

6 Claims, 10 Drawing Sheets

F I G. 1
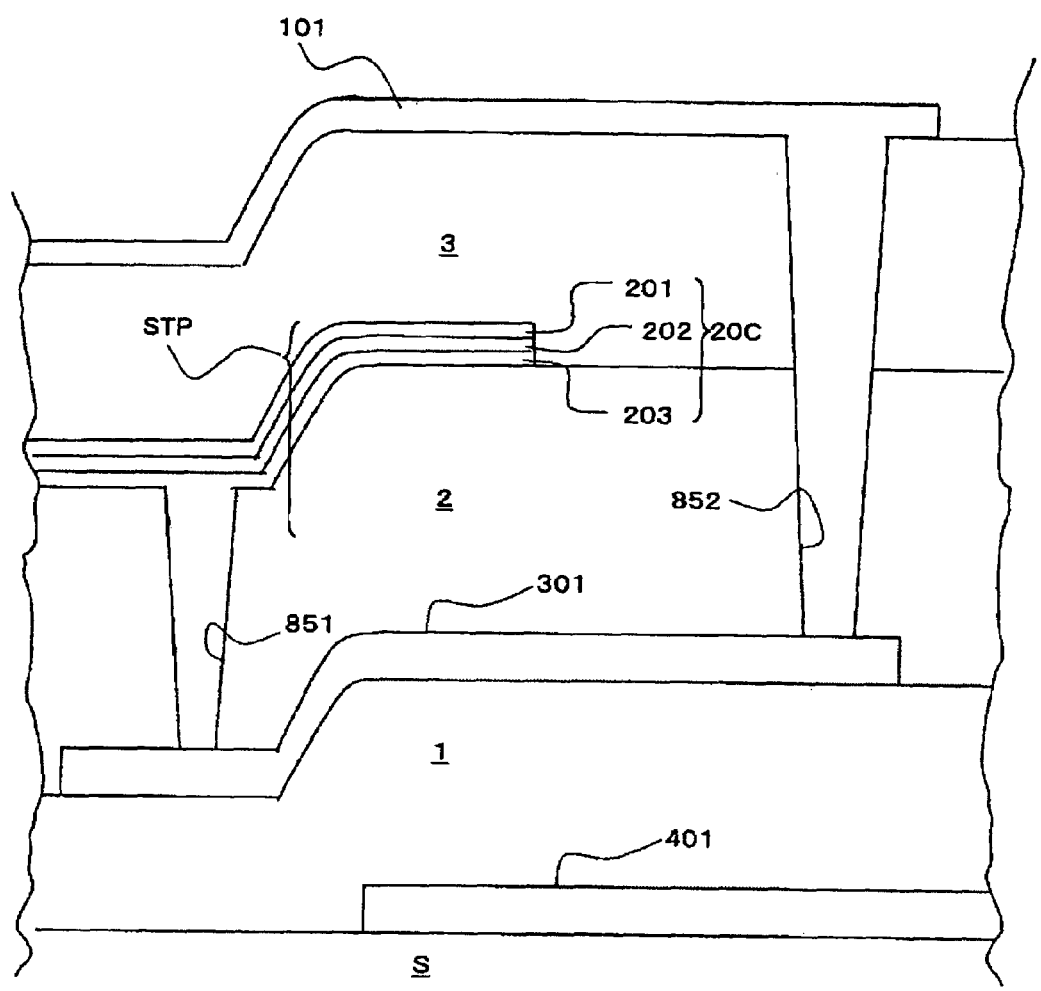

PROCESS (1)

PROCESS (2)

PROCESS (3)

PROCESS (4)

PROCESS (5)

F I G. 6
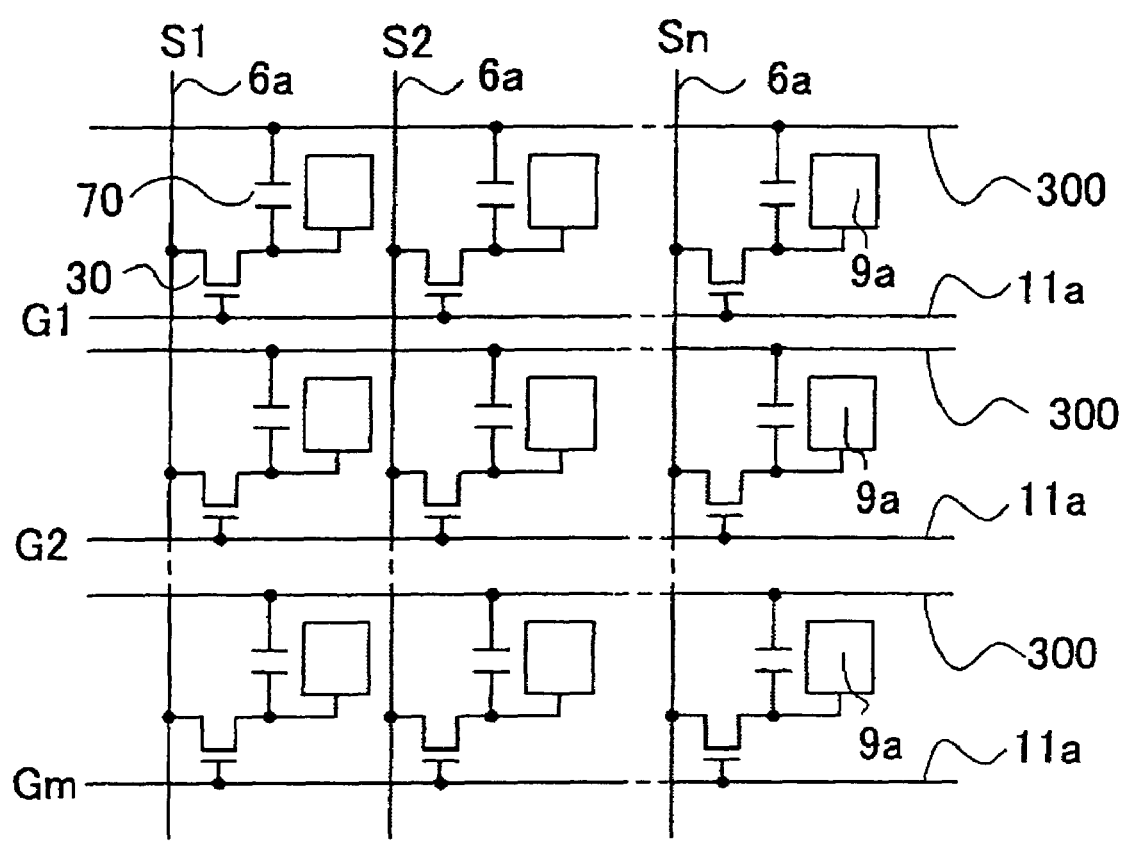

WIRING STRUCTURE, METHOD OF MANUFACTURING THE SAME, ELECTRO-OPTICAL DEVICE, AND ELECTRONIC DEVICE

BACKGROUND OF THE INVENTION

1. Field of Invention

The present invention relates to a wiring structure constructed by laminating wiring and circuit elements on a substrate and a method for manufacturing the same. Further, the present invention relates to an electro-optical device provided with such wiring structure.

2. Description of Related Art

A wiring structure of this type can include various circuit elements, such as thin film transistors (TFTs) as switching elements, thin film diodes, capacitors, resistors and the like, and wiring to connect them to each other. Recently, these various elements are frequently constructed three-dimensionally or constructed to form a laminated structure, on a substrate. For example, an arrangement is constructed in such a way that capacitors are arranged on TFTs and wiring electrically connected to the TFTs is formed on the capacitors. This construction permits a high-density wiring structure. As a result, it is possible to achieve miniaturization, narrowness and slimness of the wiring structure and an electronic device including the wiring structure.

More specifically, the wiring structure as described above is constructed, for example, by sandwiching an electro-optical material, such as a liquid crystal and the like, between a pair of substrates, and applied to an electro-optical device such as a liquid crystal device capable of displaying images by transmitting light therethrough. Further, here the image display is realized by changing the state of the electro-optical material to change the transmittance of light and to allow light beams having different gray scales per each of the pixels to be seen.

As such electro-optical device, a device is provided for allowing active matrix driving by including, on one substrate of a pair of substrates, pixel electrodes arranged in a matrix, and scanning lines and data lines provided in such a way to pass between the pixel electrodes, as well as TFTs as pixel switching elements (see, for example, Japanese Unexamined Patent Application Publication No. 2002-122889). In this electro-optical device, the above described various elements are formed on the one side of the substrates. However, if these various elements are deployed over a plane, there is a problem in that a large area is required and the pixel aperture ratio, i.e., the ratio of the overall area of the substrate to an area to transmit light decreases. Thus, if an aforementioned three-dimensional construction of the wiring structure is utilized, such inconvenience can be remarkably reduced. That is, for example, scanning lines having a function as TFTs and gate electrode films of the TFTs is formed on a substrate, data lines are formed on scanning lines, and pixel electrodes are formed on the data lines. As a result, it is possible to improve the pixel aperture ratio by appropriately setting the arrangement of various elements in addition to the miniaturization of the device.

SUMMARY OF THE INVENTION

However, in such electro-optical device, in general, it is not easy to construct an optimum laminated structure by optimally arranging the various elements as described above three-dimensionally. For instance, in the laminated structure, for the purpose of improving the voltage holding characteristics of the pixel electrodes except for the above described scanning lines, the data lines, the TFTs, and the pixel electrodes, storage capacitors electrically connected to the TFTs and the pixel electrodes may be provided. Such storage capacitors, conventionally, should have as large capacitance as possible. However, it can be very difficult to form such storage capacitors on the substrate as a part of the laminated structure. First, if the storage capacitors are merely enlarged in a plane, this reduces the pixel aperture ratio, whereby the original purpose of the electro-optical device for displaying bright images cannot be achieved. However, storage capacitors having a very small size do not enjoy enough charge capacitive characteristics, and it prevents the storage capacitors from serving as capacitors.

On the other hand, in order to cope with the general request of the miniaturization and high precision of the electro-optical device, the miniaturization and narrowness of the storage capacitors are requested. In other words, there can be required for the downsizing and lamination of a pair of electrodes constituting a storage capacitor and a dielectric film sandwiched between the electrodes. Also, in order to cope with such requirement for the downsizing and lamination, the pixel-potential-side capacitor electrode among the three elements of the storage capacitor should be electrically coupled to the pixel electrode and the TFT, respectively. However, with satisfying these requirements, it is very difficult to achieve the miniaturization and the high precision of the electro-optical device, as well as to construct an optimal laminated structure.

Such problems, particularly, for example, have come to the surface as follows. That is, if a thin film transistor, a storage capacitor (a lower electrode, a dielectric film and an upper electrode) and a pixel electrode are formed on the substrate in this order from the bottom side, the electrical connection between the lower electrode described above and the TFT and the pixel electrode should be obtained. In this case, the electrical connection between the TFT and the lower electrode is relatively easy. However, it is not easy to establish the electrical connection between the corresponding electrode and the pixel electrode. This is caused by the presence of the dielectric film and the upper electrode above the lower electrode. Therefore, in order to realize the connection therebetween, it is required to pattern the dielectric film and the fixed-potential-side capacitor electrode appropriately so that the upper side of the lower electrode is exposed. However, since various elements constituting the storage capacitor are generally laminated as described above, there is a high possibility that the so-called piercing occurs at the lower electrode if the patterning process is performed.

That is, even when it is naturally intended to etch only the upper electrode, it is probable that the dielectric film and the electrode formed below the dielectric film are etched at the same time. If this phenomenon occurs, the electrical connection between the lower electrode and the pixel electrode may not be established, whereby the storage capacitor may not serve as a capacitor.

In addition, the phenomenon becomes more severe when the storage capacitor is formed on the surface having a step. This is because the mismatch occurs between the thickness of the dielectric film and the upper electrode, which is located on the step, and the thickness of the dielectric film and the upper electrode, which are not located on the step. In this case, generally, the thickness of the former is larger than that of the latter. Therefore, if it is intended to completely remove the upper electrode located on the step (at this time, the upper electrode, which is not located on the step, is completely removed), it is mostly probable that the lower electrode, which is not located on the step, is also etched together with the upper electrode (refer to FIG. 3 and FIG. 4 for the details, which will be described later).

The present invention has been made to solve at least the above problems. It is therefore an object of the present invention to provide a wiring structure and a method for manufacturing the same for appropriately establishing an electrical connection between a first conductive layer constituting a part of a laminate and a conductive layer to be electrically connected thereto. Further, it is another object of the present invention to provide an electro-optical device provided with the wiring structure.

In accordance with one aspect of the present invention, there is provided a method for manufacturing a wiring structure including a substrate having formed thereon a first conductive layer, and an insulating film formed on the first conductive layer, a second conductive layer formed on the insulating film, a conductive layer electrically connected to the first conductive layer, and a relay layer arranged below the first conductive layer and the conductive layer, respectively. The first conductive layer and the conductive layer are electrically connected to each other through the relay layer.

According to the wiring structure, a first conductive layer and a conductive layer to be electrically coupled to the first conductive layer are electrically connected to each other via relay layers located below each of bottom layers of the conductive layers. That is, the arrangement between the first conductive layer and the relay layer is the one that the former becomes a top layer and the latter becomes a bottom layer, and the arrangement between the conductive layer and the relay electrode is the one that the former becomes a top layer and the latter becomes a bottom layer. For example, among these three elements, the relay layer is located at the lowermost layer. Also, since the electrical connection between the first conductive layer and the conductive layer is performed via the relay layer, whereby in the corresponding structure, the first conductive layer and the conductive layer have an electrical connection point at the bottom sides thereof, respectively, and the first conductive layer and the conductive layer do not have an electrical connection point at the top sides thereof, respectively.

Here, the fact that the first conductive layer does not have an electrical connection point on the upper side thereof can mean that a process or a fabrication for exposing a surface of a corresponding first electrode upward in order to electrically connect the first conductive layer and the conductive layer to be connected to the first conductive layer is not required. Here, if the first conductive layer is processed to expose its surface, there is a need for patterning the second conductive layer located on the top layer into a predetermined configuration. In other words, as the area of the second conductive layer becomes smaller than that of the first conductive layer, in other words, as the edge of the first conductive layer rips up at the edge of the second conductive layer, there is a need for patterning the second conductive layer. However, it can be very difficult to implement such patterning process. Although it is intended to etch only the second conductive layer, the probability (so called piercing) of etching of the insulating film located below the bottom layer and the first conductive layer should occur during the etching for the second conductive layer. If there occurs the piercing, it causes an inconvenience that the electrical connection point is removed at the first conductive layer.

However, in the present invention, since the electrical connection point of the first conductive layer as described above exists at the bottom side, in order to expose the surface of the first conductive layer, it is not necessary for performing the difficult patterning process for the second conductive layer.

As described above, according to the present invention, the electrical connection between the first conductive layer and the conductive layer can be well established, while an undesired defect (for example, the piercing in the first conductive layer as described above) is drastically reduced, thereby allowing a wiring structure capable of operating excellently to be provided.

Further, according to a wiring structure related to the present invention, it is allowable that the second conductive layer, the insulating film and the first electrode layer are patterned at the same time, if there is a need for performing any patterning as a whole.

One aspect of the wiring structure of the present invention can be characterized in that the laminate including the first conductive layer, the insulating film, the second conductive layer, and the relay layer, is formed on the surface having a step. According to this aspect, since the laminate comprising the first conductive layer, the insulating film, the second conductive layer, and the relay layer, is formed on the surface having a step, if the laminate is taken in a cross-sectional view, the first conductive layer, the insulating film and the second conductive layer become a shape having a curved portion. For example, the corresponding laminate has a first portion located on the first horizontal surface, a second portion located on a second horizontal plane higher than the first horizontal plane and a third portion located on the line connecting the first horizontal plane and the second horizontal plane.

In such case, for example, assuming that all of the thickness of the corresponding laminate in a vertical direction on the line and the thickness thereof in a vertical direction in the first horizontal plane are "t", and assuming that the line is inclined at an angle θ [rad] (however, 0<θ<π/2) with respect to the first horizontal plane, on the line, the thickness t2 of the laminate calculated at a direction perpendicular to the first horizontal plane meets the following equation (1).

$$t2 = t/\cos\theta \qquad \text{Eq. (1)}$$

On the other hand, the thickness t1 of the corresponding laminate in the vertical direction to the first horizontal plane is t1=t.

Like this, between the thickness t1 of the corresponding laminate in the portion of the first horizontal plane and the second horizontal plane and the thickness t2 of the corresponding laminate in the portion of the line, a relation of t2>t1 can generally occur. Also, although this relates to the thickness of the laminate, but it is needless to say that this also can apply to all of the second conductive layer, the insulating film and the first conductive layer.

Also, for the laminate existing on such step, if only the second conductive layer is etched as described above, there exists further difficult problems in etching the second conductive layer than the above described. Because, if all of the insulating film and the second conductive layer on the first conductive layer are completely etched, first, the second conductive layer formed on the first and the second horizontal planes is removed, thereafter, the second conductive layer on the line is removed, but during the process for removing the second conductive layer on the line, it is mostly probable that the layer below the first and the second horizontal planes, that is, the insulating film or the first conductive layer is removed at the same time. As a result, the probability to generate the piercing in the first conductive layer is further increased.

However, in the present invention, as described previously, since the present invention has an electrical connection point between the relay layer and the bottom side of the first conductive layer, and thus the electrical connection with the conductive layer is achieved by the electrical connection point, the difficult etching as described above need not be performed. In other words, the operational effect of the present invention can be more prominently exerted under the circumstance having the step.

Further, the step described in the aspect of the present invention, for example, in case that an interlayer insulating film can be formed on any element, such as a wiring or a circuit device formed on a substrate, can appear on the surface of the corresponding interlayer insulating film. This step is caused by the difference between the heights of the elements. In addition, as clearly described in this explanation, if any element is constructed on the substrate or below the laminate, it is very possible that the step occurs therein, and as the structure becomes more complex according to the construction, the step occurs more possibly, and the aspect of the structure becomes more complex.

Further, if only the second conductive layer is etched as described above, the degree of the inconvenience can change depending on the height of the step or the degree of the angle between the first horizontal plane and the line and the like. Generally, as the height of the step and the degree of the angle increase, the degree of the inconvenience becomes greater.

However, the present invention has nothing to do with the above-described things, basically. That is, the present invention, as described previously, can more prominently exhibit its operational effect under these circumstances.

According to another aspect of the present wiring structure, the second conductive layer can include a plurality of layers, each of the layers being made of a different material.

According to another aspect of the present wiring structure, since the second conductive layer includes a plurality of layers, each of the layers being made of a different material, generally, there occurs the case that each of the corresponding layers has a different etching rate from each other. Therefore, if only the second conductive layer is etched as described above, the implementation for these etching is more difficult than in the above described etching process. In particular, in case that a layer made of a material which is more difficult to etch is located on the top layer of the second conductive layer and a layer made of a material which is easier to etch is placed on the bottom layer, the difficulty of etching the second conductive layer increases. However, the present invention, for the reason described previously, has nothing to do with these events, inversely, the present invention more prominently exhibits its operational effects under these circumstances.

Further, as a specific example in accordance with still another aspect of the second conductive layer, for example, the second conductive layer includes the one having an aluminum top layer and a polysilicon bottom layer or the one having a plurality of dual structured layers laminated, each consisting of a tungsten silicide layer and a titanium layer in order from the top layer, and then, finally a polysilicon layer laminated at the bottom. Anyway, since each of the layers has a different etching rate, the inconvenience for etching only the second conductive layer can be prominently increased. In this aspect, it is preferable that the second conductive layer include a tungsten silicide top layer and a polysilicon bottom layer.

According to this construction, since the second conductive layer includes a tungsten silicide (WSi) top layer and a polysilicon bottom layer, the etching for the former results in an erosion of the latter, in case that only the second conductive layer is etched, the inconvenience as described above becomes more severe. Therefore, the operational effect of the present invention becomes more prominent.

In accordance with another aspect of the present wiring structure, the laminate constructs the capacitor. According to this aspect, since the laminate constructs the capacitor, an operational effect is obtained as follows. That is, as described previously, if only the second conductive layer constructing the laminate may be etched, since the piercing or the like can be generated in the insulating film or the first conductive layer, a countermeasure should be prepared in order to overcome these problems. At this time, one of effective countermeasures is the one that the insulating film or the first conductive layer is formed relatively thick. By doing this, since the insulating film or the first conductive layer is utilized as an etch stop, the etching process can be finished at the time when only the second conductive layer is etched before the piercing occurs.

However, in such countermeasures, first, there is a problem in that it does not satisfy the demands for the miniaturization and narrowness of the wiring structure. Further, secondly, if the laminate constructs the capacitor like as this aspect, there occurs a problem in that the capacity value cannot be earned due to the thick insulating film.

By the way, in the present invention, without performing the process to etch only the second conductive layer to construct the laminate as described above, the electrical connection between the second conductive layer and the conductive layer is attempted. In other words, this means that the countermeasure for making a layer, such as an insulating film thickness need not be adapted. Conversely, it means that the insulating film may be as thin as possible. So, like this aspect, if the laminate constructs the capacitor, the capacity value can be greatly increased.

In this aspect, it is preferable that the insulating film include a layer made of a high dielectric material. By such construction, the capacity value of the capacitor can be further augmented.

Further, more specifically, in case that the insulating film includes a layer made of a material, such as silicon nitride (SiN), having a high dielectric material, in comparison with the insulating film including only the silicon oxide film, the inconvenience becomes more prominent if only the second conductive layer is etched (i.e., nitride silicon is more easily etched).

However, in the present invention, for the reason previously described, it has nothing to do with the above event, conversely, the present invention exhibits operational effect more prominently under these circumstances.

Further, the high dielectric material as described in the present invention is an insulating material including at least one selected from oxide tantal (TaOx), barium strontium titanate (BST), lead zirconium titanate (PZT), titanium dioxide ($TiO_2$), zirconinm dioxide ($ZiO_2$), hafnium oxide ($HfO_2$) and acid silicon nitride (SiON) in addition to the nitride silicon as described above. Particularly, if the high dielectric material such as TaOx, BST, PZT, $TiO_2$, $ziO_2$, and $HfO_2$ is utilized, the capacity value can be increased at a given area of substrate. Or, if a material including silicon dioxide (SiO$_2$), acid silicon nitride (SiON) and nitride silicon (SiN) is utilized, the generation of stress in the interlayer insulating film can be reduced.

Or, it is preferable that the insulating film be made of a plurality of layers, each of the layers made of a different material, and one layer among these layers has a higher dielectric constant than that of the other layers. By this configuration, the capacity value of the capacitor can be increased. Further, in such configuration, for example, since the insulting layer takes a dual layer structure including a silicon nitride layer and a silicon oxide film, the former silicon nitride layer gives a large capacity value and the latter silicon oxide layer secures the voltage-proof property, thereby achieving the high performance of the capacitor.

In accordance another aspect of the present wiring structure, the wiring structure includes a first interlayer insulating film formed between the first conductive layer and the relay layer and between the conductive layer and the relay layer, a second interlayer insulating film formed between the conductive layer and the relay layer, a first contact hole for electrically connecting the first conductive layer to the relay layer and a second contact hole for electrically connecting the conductive layer to the relay layer. In accordance with this aspect of the present invention, the wiring structure includes a first interlayer insulating film and a second interlayer insulating film, a first contact hole, passing through only the first interlayer insulating film, for electrically connecting the first conductive layer to the relay layer and a second contact hole, passing through both of the first and the second interlayer insulating films, for electrically connecting the conductive layer to the relay layer. Like this, in accordance with an aspect of forming the first conductive layer and the conductive layer as a different layer, the miniaturization and narrowness of the corresponding wiring structure are more effectively achieved by obtaining further densifying the corresponding wiring structure.

Further, the first interlayer insulating film and the second interlayer insulating film include a plurality of interlayer insulating films, respectively. For example, between the relay layer and the first conductive layer, any other element exists, and it is preferable that the interlayer insulating films be formed above and below the element, respectively (in this case, the first interlayer insulating film includes two layers of interlayer insulating film).

In accordance with the preferred embodiment of the present invention, a method for manufacturing a wiring structure can include forming a relay layer on a substrate, forming a first interlayer insulating film on the relay layer, forming in the first interlayer insulating film a first contact hole leading to the relay layer, forming a first conductive layer on the first interlayer insulating film so as to bury the first contact hole, forming an insulating film and a second conductive layer sequentially on the first conductive layer, forming a second interlayer insulating film on the second conductive layer, forming in the second interlayer insulating film and the first interlayer insulating film a second contact hole leading to the relay layer, and forming a conductive layer on the second interlayer insulating film so as to bury the second contact hole.

According to the method for manufacturing the wiring structure of the present invention, it can very adaptively manufacture the wiring structure of the present invention as described above.

Further, the first interlayer insulating film and the second interlayer insulating film include a plurality of interlayer insulating films, respectively. For example, any other element exists between the relay layer and the first conductive layer, and the interlayer insulating films may be formed above and below the element (in this case, the first interlayer insulating film includes two layers of interlayer insulating film).

In accordance with one aspect of the method for manufacturing the wiring structure according to this embodiment, the first conductive layer, the insulating film and the second conductive layer are formed on the surface having a step.

In accordance with this aspect, the laminate including a first conductive layer, an insulating film and a second conductive layer, by being formed on the surface having the step, has a shape with a curved portion in cross-sectional view. In this case, if only the second conductive layer is etched, an accompanying inconvenience as described above occurs. However, for this aspect, the first conductive layer is already electrically connected to the relay layer at this time through the first contact hole, and then, the relay layer is electrically connected to the conductive layer through the second contact hole. Accordingly, since the electrical connection between the first conductive layer and the conductive layer can be realized, it is not necessary to etch only the second conductive layer.

As described above, in accordance with the present aspect, the present invention exhibits its operational effect more prominently.

To solve at least the above described problems, an electro-optical device according to this embodiment can be provided with data lines extending along a first direction, scanning lines extending along a second direction intersecting the data lines, on a substrate, and pixel electrodes and thin film transistors arranged so as to correspond to intersection regions between the data lines and the scanning lines, as a part of a laminated structure, and on the substrate. The electro-optical device can further include storage capacitors electrically connected to the thin film transistors and the pixel electrodes, and relay electrodes arranged below the pixel electrodes and the storage capacitors, respectively, as a part of a laminated structure. One electrode of a pair of electrodes constituting each storage capacitor is electrically connected to the pixel electrode through the relay electrode.

The electro-optical device of the present invention is more specific and more practical application example of the wiring structure of this embodiment as described above. That is, in the electro-optical device related to the present invention, the relay electrode is corresponding to the relay layer in the wiring structure of the present invention as described above, one side of electrode can correspond to the first conductive layer, and the pixel electrode can correspond to the conductive layer, respectively. Further, the storage capacitor as described in the present invention can correspond to the above described laminate.

Therefore, in accordance with the electro-optical device of the present invention, the substantially same operational effect as the operational effect exerted by the wiring structure of the present invention can be obtained. That is, according to the present invention, in order to electrically connect the storage capacitor and the pixel electrode, it is not necessary that the difficult process for etching only the other electrode to constitute the storage capacitor is performed; it is realized well by performing the electrical connection between the storage capacitor and the pixel electrode through the relay electrode.

Further, in the present invention, in that the etching step for only the other side of the electrodes as described above is not required, the storage capacitor is formed without an undesired defect (for example, a piercing in the one side of the electrodes).

Further, according to the present invention, in case that the implementation of any patterning is required for the overall storage capacitor, it is possible that the fixed-potential-side capacitor electrode, the dielectric film and the pixel-potential-side capacitor electrode are simultaneously patterned.

In accordance with one aspect of the present electro-optical device, the storage capacitor is formed on the surface having the step. In accordance with this aspect, the laminate in the present wiring structure as described above can enjoy a similar operational effect to that in the case where it is formed on the surface having a step. That is, in short, in case that only the pixel-potential-side capacitor electrode of the storage capacitor is etched, and it is formed on the surface having a step, the etching becomes very difficult. However, the present invention has nothing to do with this fact basically. Conversely, in this case, conventionally, after paying careful attention to this, the electrical connection between the pixel-potential-side capacitor electrode and the pixel electrode must be realized by performing the etching. However, in the present invention, this process is not necessary, and therefore, the present invention can exhibit its operational effect more prominently under these circumstances.

In accordance with another aspect of the present electro-optical device, the electro-optical device can include a plurality of pixel-potential-side capacitor electrodes, with the one side electrode electrically connected to the pixel electrode and the thin film transistors. The storage capacitor can include pixel-potential-side capacitor electrodes, fixed-potential-side capacitor electrodes as a fixed potential arranged to face to the pixel-potential-side capacitor electrode, and a dielectric film inserted between pixel-potential-side capacitor electrodes and the fixed-potential-side capacitor electrodes, the dielectric film layer constituting a laminate including a layer made of a high dielectric material.

According to this aspect, since the storage capacitor includes the high dielectric material, the capacity value can be increased. Furthermore specifically, in case that the dielectric film includes nitride silicon (SiN) as one example of the high dielectric material, it becomes inconvenient more prominently in comparison with the case that the dielectric film includes only the silicon oxide (i.e., the silicon nitride is more easily etched). Further, the high dielectric material as described in the present invention has the meaning as described above.

In accordance with another aspect of the present electro-optical device, the relay electrode can be made of the same film as the gate electrode of the thin film transistor incorporated into the scanning line. According to this aspect, since the relay electrode is made of the same film as the gate electrode of the thin film transistor incorporated into the scanning line, for example, it is possible to achieve the simplification of manufacturing process or the low manufacturing cost in comparison with the case that the relay electrode is manufactured via a specific process.

Further, in accordance with such aspect, the arrangement between the pixel-potential-side capacitor electrodes, the relay electrodes and the pixel electrodes can be determined more smoothly, and the determination of the specific aspect of the laminated structure on the substrate can be more adaptable or the degree of layout of various elements can be increased.

Further, such operational effect is more effectively obtained as follows. That is case that the thin film transistor is located at the lowest or lower layer of the laminated structure. As a result, the aspect that the relay electrode is located at the lower layer in comparison with the storage capacitor and the pixel electrodes is smoothly realized.

Also, like this, in case that the scanning line includes the gate electrodes, in order to sufficiently exert the function as the gate electrode, at least the portion of the gate electrode among the scanning lines, for example, is preferably made of a conductive polysilicon film. In this case, in the present aspect that the gate electrodes and the relay electrodes are made of the same film, the relay electrode is also made of the conductive polysilicon film.

Further, as clear from the description of the aspect, conversely, it is not necessary that the same film as the gate electrodes is used to form the relay electrode of the present invention. In this case, as described above, since the relay electrode and the gate electrode are not made of the same material, basically, the material of the relay electrode, as far as it has conductivity, can be selected freely.

In accordance with another aspect of the present electro-optical device, the fixed-potential-side capacitor electrode can be formed so as to cover the pixel voltage side capacitor electrode.

According to this aspect, since the fixed-potential-side capacitor electrode is formed so as to cover the pixel voltage side capacitor electrode, it is possible that the dielectric film is inserted into further wide area of the electrodes, thereby constructing a storage capacitor having a larger size of capacity value. In particular, for example, in the present aspect, the sidewalls of the three elements can be utilized as a capacitor, thereby expecting the increase of the capacity value. Further, from the viewpoint of this, for example, if the pixel-potential-side capacitor electrode is formed thick, the area of the sidewall becomes larger, thereby effectively obtaining the capacity value.

Such functions and the other advantages become clear from the preferred embodiments of the present invention described hereinafter.

BRIEF DESCRIPTION OF THE DRAWINGS

The invention will be described with reference to the accompanying drawings, wherein like numbers represent like elements, and wherein:

FIG. 1 is a cross-sectional view illustrating one example of a wiring structure according to an embodiment of the present invention;

FIG. 6 is a circuit diagram illustrating an equivalent circuit of various elements, wiring, and the like provided in a plurality of pixels in a matrix constituting an image display region in the electro-optical device according to the embodiment of the present invention;

DETAILED DESCRIPTION OF PREFERRED EMBODIMENTS

Figure 2:
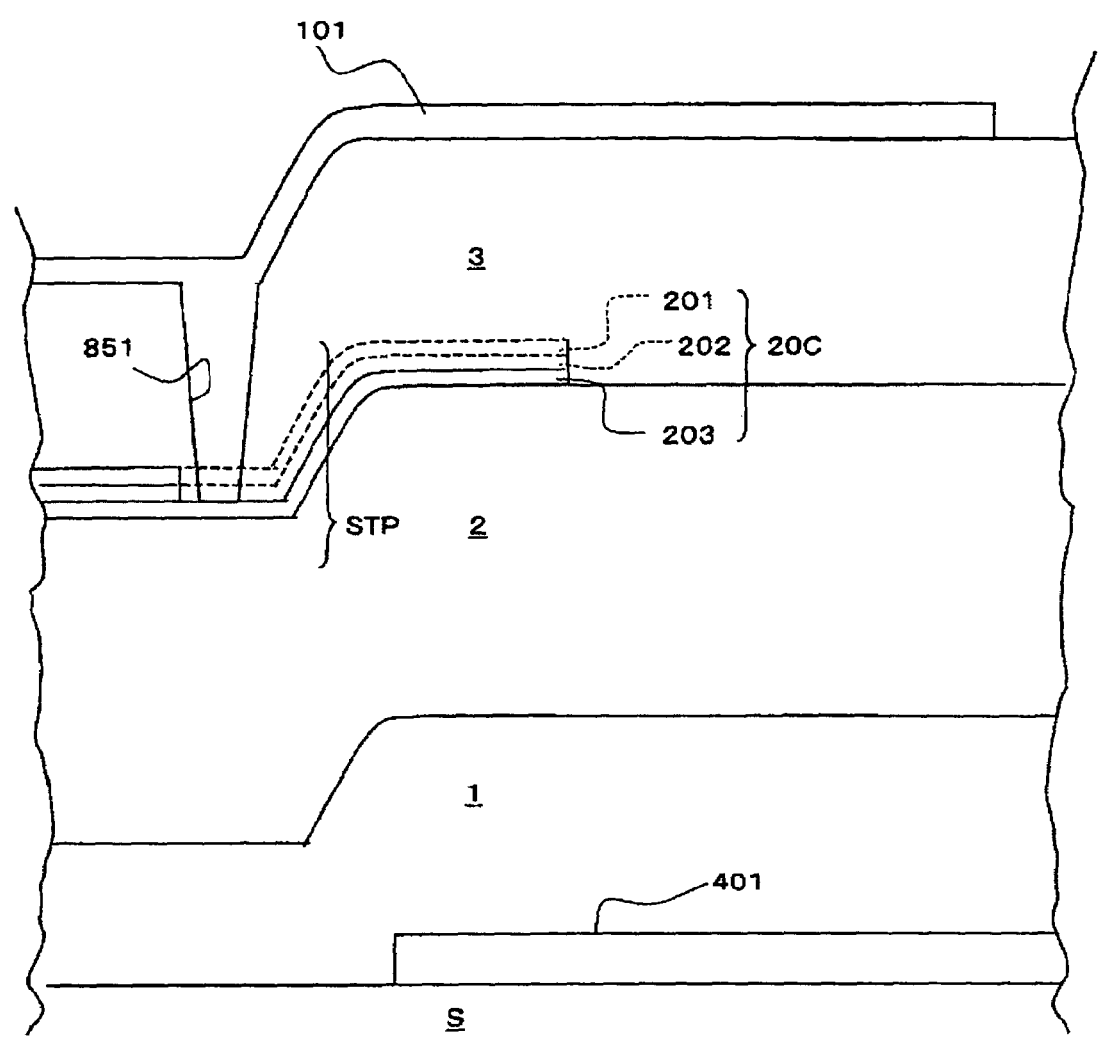
FIG. 2 is a cross-sectional view seen at a same angle as in FIG. 1 and illustrating a structure being compared with the wiring structure shown in FIG. 1.

Hereinafter, preferred embodiments of the present invention will be explained with reference to the drawings. In the following description, first, one example of a wiring structure related to this embodiment, then operational effects obtained from the wiring structure are described in relation to the method for manufacturing the same.

First, the wiring structure according to this embodiment will be described with reference to FIG. 1. Here, FIG. 1 is a cross-sectional view illustrating one example of the wiring structure related to this embodiment. In FIG. 1, the wiring structure can include wiring 401, a relay layer 301, a capacitor 20C as one example of a laminate as referred to as the present invention, and a conductive layer 101, in order from the bottom side. Further, a third interlayer insulating film 3 is formed between the conductive layer 101 and the capacitor 20C, a second interlayer insulating film 2 is formed between the capacitor 20C and the relay layer 301 and a first interlayer insulating film 1 is formed between the relay layer 301 and the wiring 401, respectively, thereby preventing the respective elements from shorting therebetween. Moreover, the first to third interlayer insulating films 1, 2 and 3 are made of, for example, a silicon oxide film.

In the wiring structure, first, the wiring 401 can be formed on a substrate S. The wiring 401, although shown that it is not connected to the other elements in FIG. 1, is actually connected to some elements (not shown) to exhibit its function as wiring. In particular, FIG. 1 shows that the wiring 401 is formed, and thereby a step STP is formed in constructional elements located above the wiring 401. Such step STP is transferred to the uppermost layer through the first to third interlayer insulating films 1, 2 and 3.

The relay layer 301 can be formed on the wiring 401 via the first interlayer insulating film 1, and the capacitor 20C is formed on the relay layer 301 via the second interlayer insulating film 2. Also, these relay layer 301 and capacitor 20C are electrically coupled to each other through a contact hole 851. More specifically, the capacitor 20C includes an upper electrode 201, an insulating layer 202, and a lower electrode 203 among which the lower electrode 203 is electrically connected to the relay layer 301. Particularly, in this embodiment, the upper electrode 201 has a laminated structure including a layer made of a WSi film (hereinafter, referred to as a WSi layer) on an upper layer in the FIG. 1 and a layer made of a polysilicon film (hereinafter, referred to as a polysilicon film) below the upper layer (these are not shown in FIG. 1 and FIG. 2 and refer to FIG. 3 and FIG. 4 which will be described later).

On the capacitor 20C, the conductive layer 101 is formed via the third interlayer insulating film 3. Also, the conductive layer 101 is electrically connected to the relay layer 301 via a contact hole 852, which is opened by penetrating the second and third interlayer insulating films 2 and 3.

In such wiring structure, it is required to electrically connect the lower electrode 203 and the conductive layer 101 to each other. It is considered that the requirement is based on various factors. For example, as described in an embodiment of an electro-optical device, which will be described in greater detail below, in case that the conductive layer 101 is a pixel electrode (reference numeral 9*a* in FIG. 6 or FIG. 9) for applying electric field to liquid crystal molecules, the capacitor 20C is an storage capacitor (reference numeral 70 in FIG. 6 or FIG. 9) for improving the voltage holding characteristics of the pixel electrode, and the lower electrode 203 is a lower electrode (reference numeral 71 in FIG. 6 or FIG. 9) as a pixel-potential-side capacitor electrode, and in other cases, in order to implement the flow of signals representing the TFT, the lower electrode and the pixel electrode by connecting the drain electrode of the TFT to the lower electrode, the electrical connection between the lower electrode 203 and the conductive layer 101 becomes necessary.

Also, taking notice of the arrangement of the relay layer 301, the lower electrode 203 constituting the capacitor 20C, and the conductive layer 301 in the arrangement of various elements related to this embodiment of such construction, it could be said that the relay layer 301 is arranged below the lower electrode 203 and the conductive layer 101, respectively. That is, the relay layer 301 among these three elements is located at the lowermost layer.

By the above construction, an electrical connection point of the lower electrode 203 with the relay layer 301 is located at the lower side of the lower electrode 203, and an electrical connection point of the conductive layer 101 with the relay layer 301 is also located at the lower side of the conductive layer 101.

According to the wiring structure constructed as described above, the following operational effect can be obtained. This point becomes clearer as compared with a wiring structure, which does not adopt the structure shown in FIG. 1. Hereinafter, this comparison will be explained with reference to FIG. 2. Here, FIG. 2 is a cross-sectional view, as seen from the same viewpoint as FIG. 1, illustrating the structure to implement the comparison with the structure shown in FIG. 1. Moreover, it should be noted that like reference numerals are given to like elements between FIG. 1 and FIG. 2, for the simplicity of the explanation, and the explanation thereof will be made.

First, in FIG. 1, as described earlier, the lower electrode 203 and the relay layer 301 are electrically connected to each other through the contact hole 851 opened in the first interlayer insulating film 1 formed therebetween. Therefore, it can be noted that the electrical connection point of the lower electrode 203 with the relay layer 301 is located below the lower electrode 203.

On the contrary, in FIG. 2, there is no the relay layer 301. Therefore, the electrical connection between the lower electrode 203 and the conductive layer 101 is realized through a contact hole 851' having an electrical connection point above the lower electrode 203. More specifically, the contact hole 851' opens in the third interlayer insulating film 3, the upper electrode 201, and the insulating layer 202, and the conductive layer 101 is formed to bury the contact hole 851'.

That is, in such structure, in order to establish the electrical connection between the lower electrode 203 and the conductive layer 101, as clear in FIG. 2, the upper side of the lower electrode 203 should be utilized. Therefore, in this case, only the upper electrode 201 constituting the capacitor 20C or only the insulating layer 202 constituting the capacitor 20C should be etched (refer to dashed lines in the drawing). This is because the top surface of the lower electrode 203 should be exposed upwardly in order to establish an electrical connection with the upper side of the lower electrode 203.

However, it is very difficult in such etching process. Hereinafter, the explanation for this point will be described with reference to FIG. 3 and FIG. 4. Here, FIG. 3 and FIG. 4 are process views illustrating the process for etching only the upper electrode 201 in the wiring structure shown in FIG. 2.

Figure 3:
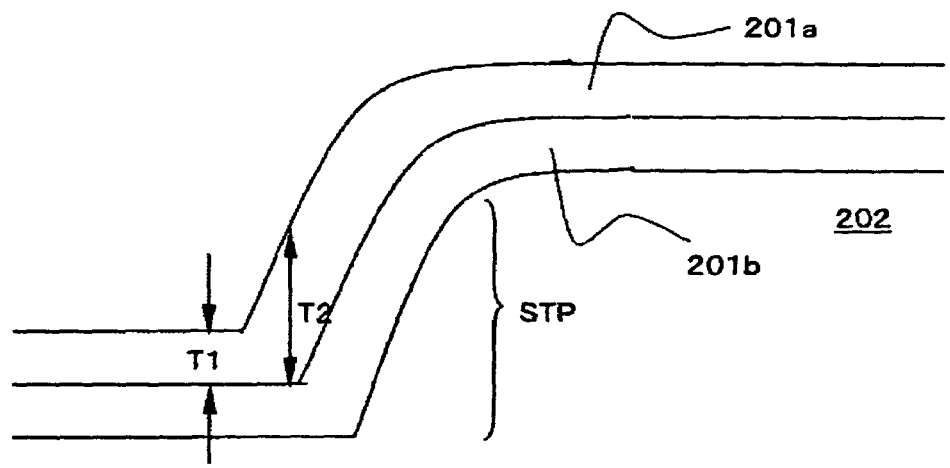
FIG. 3 is a process view (1) illustrating a process for etching only an upper electrode in the wiring structure of FIG. 2.
Figure 3:
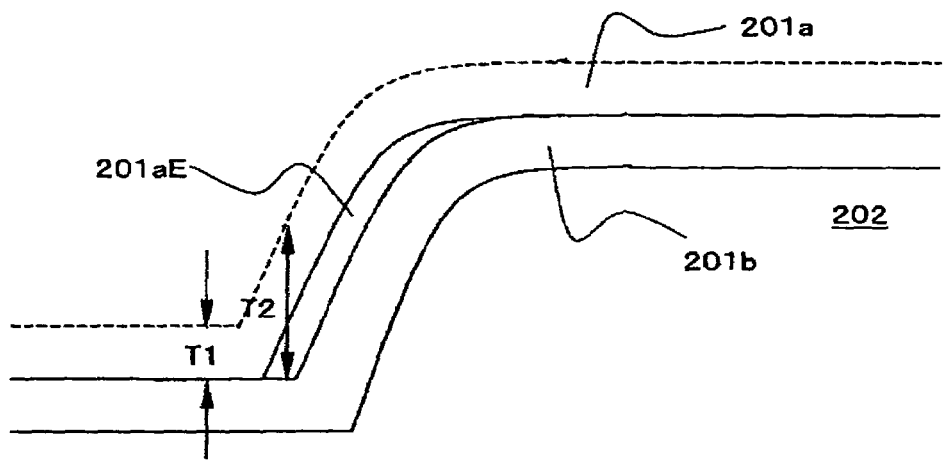
Figure 3:
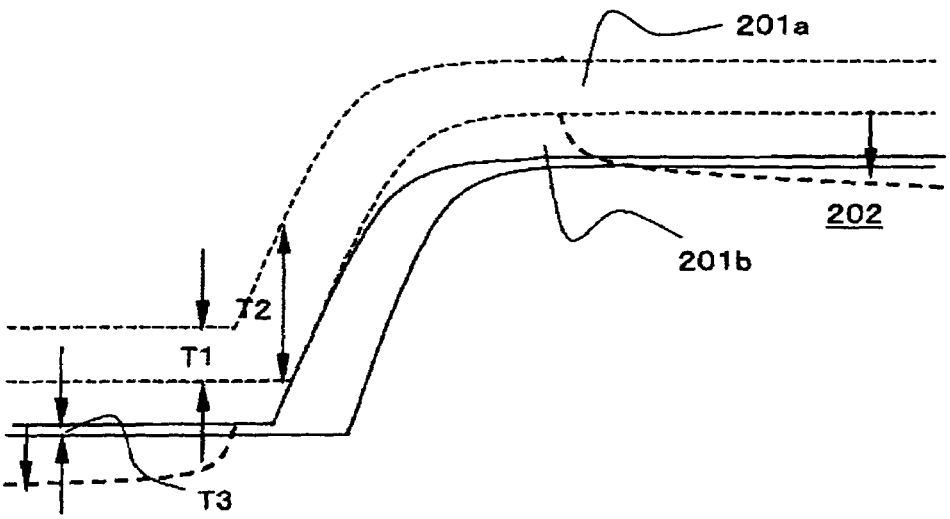
Figure 4:
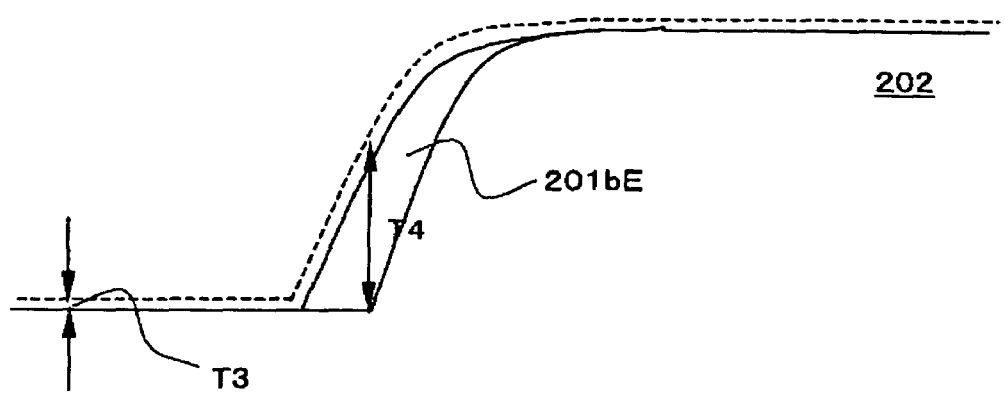
FIG. 4 is a process view (2) illustrating a process for etching only the upper electrode in the wiring structure of FIG. 2.
Figure 4:
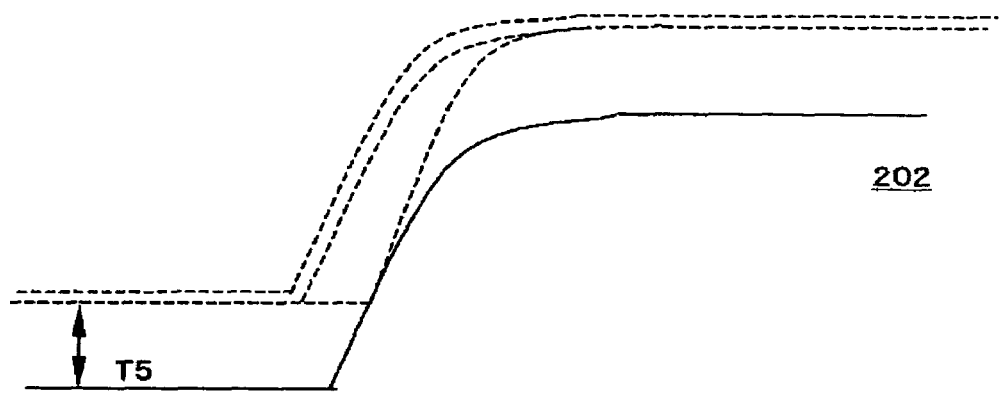

First, in process (1) of FIG. 3, only a WSi layer 201a, a polysilicon layer 201b, and an insulating layer 202 made of a silicon oxidation film located under the polysilicon layer 201b and the like, are shown among the elements of the capacitor 20C. Further, since this capacitor 20C is formed on the step STP, any of the WSi layer 201a, the polysilicon layer 201b, and the insulating layer 202 has a curved shape in cross-sectional view. Moreover, the capacitor 20C is formed on the step STP. As a result, as shown in process (1) of FIG. 3, regarding the WSi layer 201a, the thickness T1 of the WSi layer 201a formed on the horizontal surface is different from the thickness T2 of the WSi layer 201a formed on the step STP (i.e., T2>T1).

However, for the capacitor 20C formed on such step STP, in case that only the WSi layer 201a and the polysilicon layer 201b are etched while the insulating layer 202 are kept remaining at the lower electrode 203 (i.e., the insulating layer 202 is utilized as a so-called "etch stop"), first, only the WSi layer 201a is etched as shown in process (2) in FIG. 3. As a result, the WSi layer 201a is diminished from the insulating layer 202 (refer to the broken line in the drawing). However, in process (2) in FIG. 3, a remaining portion 201aE is formed. This, as described with reference to process (1) in FIG. 3, is resulted from the difference between the thickness T1 of the WSi layer 201a formed on the horizontal surface and the thickness T2 of the WSi layer 201a formed on the step STP. That is, the WSi layer 201a remains on the polysilicon layer 201b without being etched by the difference (T2−T1).

Therefore, the etching of the WSi layer 201a lasts, as shown in process (3) in FIG. 3, until the remaining portion 201aE is removed. However, in this case, the polysilicon layer 201b located under the WSi layer 201a is also etched simultaneously. Eventually, by performing the over-etching of the WSi layer 201a in order to remove the remaining portion 201aE, in process (3) in FIG. 3, the thickness of the polysilicon layer 201b formed on the horizontal surface becomes the thickness T3 thinner than the thickness of an initially formed film.

Moreover, in the etching of the WSi layer 201a of this case, there simultaneously exists a problem in that the etching rate of the polysilicon 201b is larger than the etching rate of the WSi layer 201a. That is, the polysilicon layer 201b still exists while it narrowly remains by the thickness T3, in process (3) in FIG. 3. However, in the worse case, the polysilicon layer 201b may be completely lost in process (3) of FIG. 3 (refer to the bold broken line in process (3) of FIG. 3). Further, the etching of the WSi layer 201a causes the etching of the insulating layer 202. As a result, the erosion of the insulating layer 202 may occur after the polysilicon layer 201b has been completely lost. Further, the loss of the insulating layer 202 may occur. Furthermore, the erosion of a layer (i.e., the lower electrode 203) located beyond and further below the insulating layer 202 may be caused.

In addition, the phenomenon as described above becomes more serious when the step STP is relatively and extremely large. This is because the larger step STP results in the larger remaining portion 201aE. Therefore, in order to remove this, the WSi layer 201a is etched during a relatively long period. Like this, the etching for the laminate accompanies an extreme difficulty.

Then, subsequently to process (3) of FIG. 3, the polysilicon layer 201b is etched in process (4) of FIG. 4. According to this, the polysilicon layer 201b formed on the horizontal surface with the thickness T3 is first etched. However, for the polysilicon layer 201b, a portion of the polysilicon layer 201b having the thickness T4 larger than the thickness T3 exists on the step STP. Therefore, in the etching in process (4) of FIG. 4, the remaining portion 201bE is created similarly to the WSi layer 201a. Therefore, for this polysilicon layer 201b, an over-etching is required in order to remove the remaining portion 201bE.

Figure 5:
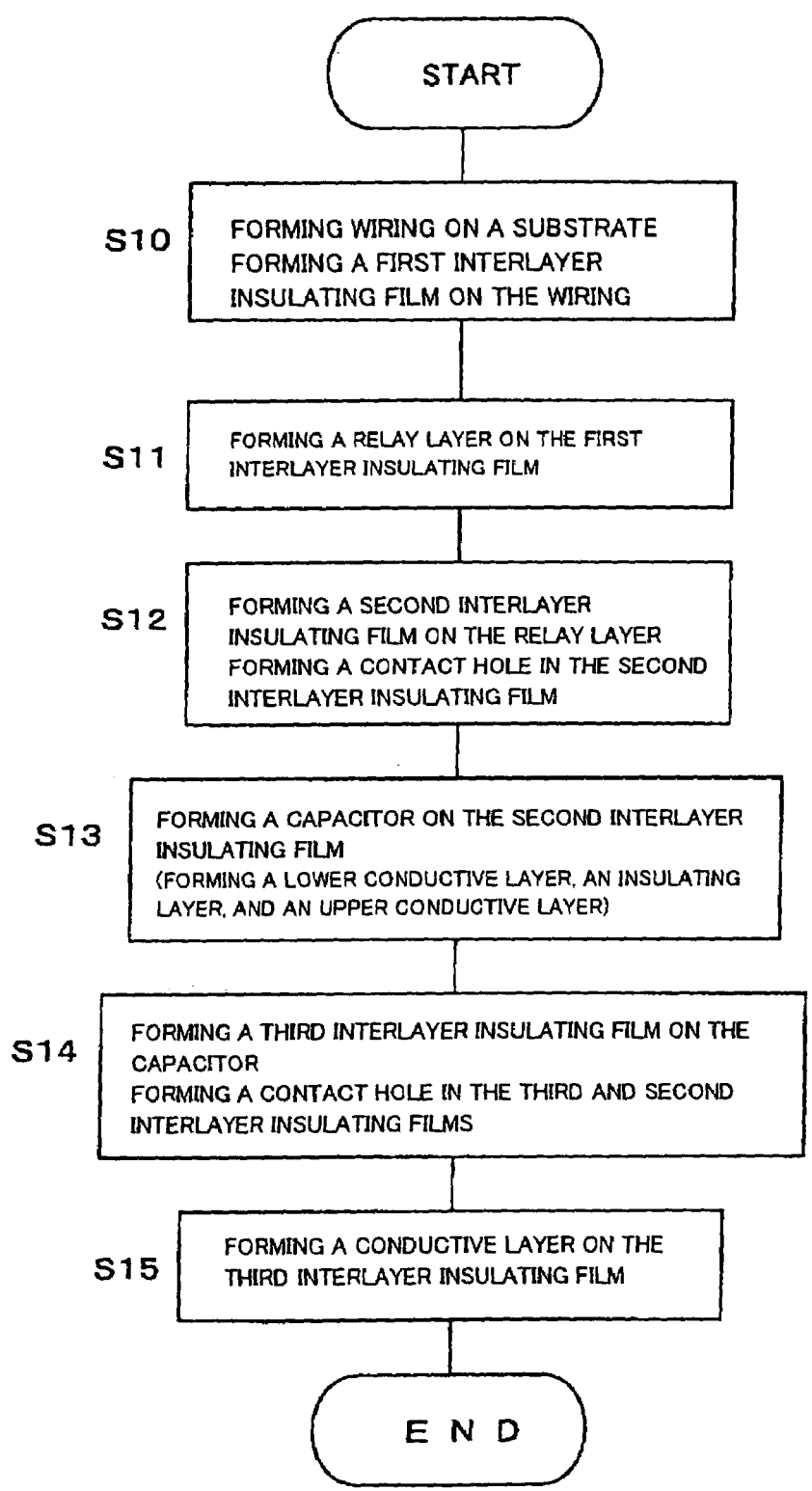
FIG. 5 is a flowchart illustrating a method for manufacturing the wiring structure shown in FIG. 1.

Then, eventually, the polysilicon layer 201b, as shown in process (5) of FIG. 5, is completely removed from the insulating layer 202, but at the same time the insulating film 202 located at the lowermost layer in FIG. 4 is etched by thickness T5 that should not be naturally etched. This is not a naturally desired phenomenon. Also, if the thickness T5 is larger than the thickness (hereinafter, referred to as the thickness Ts, though not shown in the drawing) of a film which was originally formed as the insulating layer 202, the insulating layer 202 is completely diminished though the inventor has a mind to keep the insulating layer 202 remaining thereon. Further, in case that the thickness T5 is extremely larger than the thickness Ts, in other words, in case that the step STP is relatively and extremely large, it is possible that the erosion of a layer (i.e., the lower electrode 203) located beyond and further below the insulating layer 202 may occur.

As described above, conventionally, the etching of the capacitor 20C in the step STP was very difficult. However, in this embodiment, it is not required to undergo the each of processes of FIG. (3) and FIG. (4). This is because, in FIG. 1, in electrically coupling the lower electrode 203 to the conductive layer 101, the contact hole 851' (refer to FIG. 2) to directly connect the lower electrode 203 and the conductive layer 101 to each other is not utilized and the lower electrode 203, and the conductive layer 101 are connected to each other through the relay layer 301 located below them, respectively. If the lower electrode 203 has an electrical connection point at the lower side in the drawing, each process in FIG. 3 and FIG. 4 is not required.

As described above, according to this embodiment, the electrical connection between the lower electrode 203 and the conductive layer 101 is well realized, and at the same time, possibility of causing a defect (for example, the piercing in the lower electrode 203 as described above) for the capacitor 20C is drastically reduced, thereby allowing a wiring structure capable of excellent operation characteristics to be provided.

Further, in this embodiment, a mass storage can be achieved in the light of the fact that the laminate called in the present invention constructs the capacitor 20C. This is because, in this embodiment, the electrical connection between the lower electrode 203 and the conductive layer 101 through each of the processes of FIG. 3 and FIG. 4 as described above is not required, or it is not required to keep the thickness of the insulating layer 202 relatively large owing to the concern of the piercing in the insulating layer 202 or the lower electrode 203. That is, the thickness of the insulating layer 202 can be formed as thinly as possible. Therefore, the mass storage of the capacitor 20C can be achieved.

Furthermore, in this regard, according to this embodiment, a person need not concern the piercing in the above-described insulating layer 202. This means that there is no special restriction in selecting a material constituting the insulating layer 202. For example, if a silicon nitride film having a higher dielectric constant than the silicon oxide film is selected as the material constituting the insulating layer 202, it is very suitable for increasing the capacity of the capacitor 20C. However, from the viewpoint of the etching selectivity therebetween, if the silicon nitride film, which is more easily etched than the silicon oxide film, is selected, the probability of the piercing in the insulating layer 202 tends to increase. Therefore, conventionally, the silicon oxide film has been selected for the formation of the insulating layer 202.

However, in this embodiment, there is no need to be concerned about that. In this embodiment, the increase in the storage of the capacitor 20C is promoted from such viewpoint. In other words, the insulating layer 202 is composed of a plurality of layers, each including a different material, one layer among which has a structure including a material having a higher dielectric constant than the other layers, that is, a laminated structure.

Further, although an aspect having the capacitor 20C formed on the step STP has been described in the above embodiment, it should be understood that the present invention is not limited thereto. For example, even if the step STP does not exist, and in case that etching only the upper electrode 201 is required, there is a problem to concern about disadvantages as described above. Therefore, even if the capacitor 20C or the laminate called further generally in the present invention is not formed on the step, it is possible to enjoy the operational effect of the present invention correspondingly.

Further describing in relation to the step STP, the step STP in the above embodiment is formed due to the height of the wiring 401. Generally, however, in the wiring structure constituting various electronic devices, steps may be formed which are higher, steeper, and more complex in shape than the step STP shown in FIG. 1 (for example, a certain step reflects the height of a plurality of elements formed located below the step). On the contrary, the present invention is not related to these facts, basically. This is because, if the relay layer 301 is provided, the electrical connection between the first conductive layer and the conductive layer is well realized regardless of the corresponding step. Inversely, the higher, steeper and more complex the corresponding step is, the higher the value of the present invention becomes.

Hereinafter, the method for manufacturing the wiring structure according to the present invention will be described with reference to the flowchart of FIG. 5 and FIG. 1.

First, as in step S10 of FIG. 5, after wiring 401 is formed on a substrate S, a first interlayer insulating film 1 is formed on the wiring 401. As a result, a step STP caused by the height of the wiring 401 is formed on the surface of the first interlayer insulating film 1.

Next, as in step S11 of FIG. 5, a relay layer 301 is formed on the first interlayer insulating film 1.

Next, as in step S12 of FIG. 5, a second interlayer insulating film 2 is formed on the relay layer 301. Subsequently, a contact hole 851 is formed on the second interlayer insulating film 2 so as to lead to the relay layer 301.

Next, as in step S13 of FIG. 5, after a lower electrode 203 is formed on the second interlayer insulating film 2 or formed to bury the contact hole 851, an insulating layer 202 and an upper electrode 201 are formed on the lower electrode 203, thereby constructing a capacitor 20C. This process establishes the electrical connection between the lower electrode 203 and the relay layer 301.

Next, as in step S14 of FIG. 5, a third interlayer insulating film 3 is formed on the capacitor 20C. Subsequently, a contact hole 852 is formed in such a way that it leads to the relay layer 301 through the third interlayer insulating film 3 and further the second interlayer insulating film 2 located under the third interlayer insulating film 3.

Next, as in step S15 of FIG. 5, a conductive layer 101 is formed on the third interlayer insulating film 3 to bury the contact hole 852. This process establishes the electrical connection between the conductive layer 101 and the relay layer 301, thereby establishing the electrical connection between the conductive layer 101 and the lower electrode 203.

Like this, in manufacturing the wiring structure related to this embodiment, an electrical connection between the lower electrode 203 and the conductive layer 101 is realized in a very suitable manner without undergoing a difficult process for etching only the upper electrode 201 as described in FIG. 3 and FIG. 4.

Further, the above described wiring 401, relay layer 301, three elements constituting the capacitor 20C, and the conductive layer 101 may be formed, respectively, by forming a precursor film made of an appropriate conductive material on the entire surface of the substrate S by using a sputtering method or a chemical vapor deposition (CVD) method, and then patterning the precursor film so as to have an appropriate plane shape by using photolithography and etching. Further, the present invention can include a construction in which the other elements mixedly exist between the elements (for example, a construction in which another element such as wiring exists between the relay layer 301 and the lower electrode 203). The point of the above description is that, from the viewpoint of the flow of electric current, any construction will be included within the range of the present invention provided that the current can flow from the lower electrode 203 (or the conductive layer 101) to the relay layer 301 below the lower electrode 203, and from the relay layer 301 to the conductive layer 101 (or a lower electrode 203) above the relay layer 301.

Hereinafter, an embodiment of the present invention will be described with reference to the drawing. The following embodiment relates to application of the electro-optical device of the present invention to a liquid crystal device.

Figure 7:
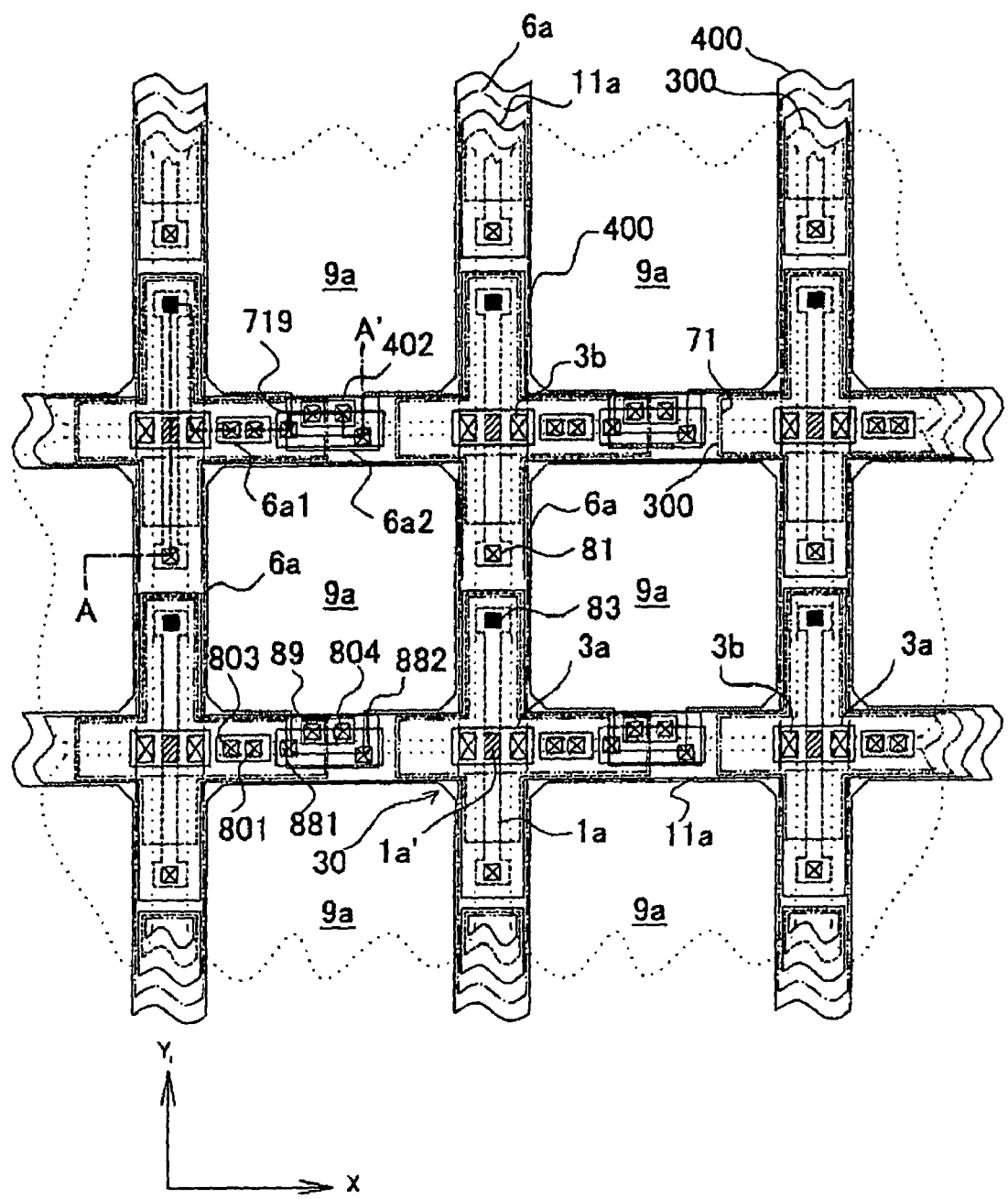
FIG. 7 is a plan view illustrating a group of a plurality of pixels adjacent to each other of a TFT array substrate on which data lines, scanning lines and pixel electrodes in the electro-optical device according to the embodiment of the present invention are formed.
Figure 8:
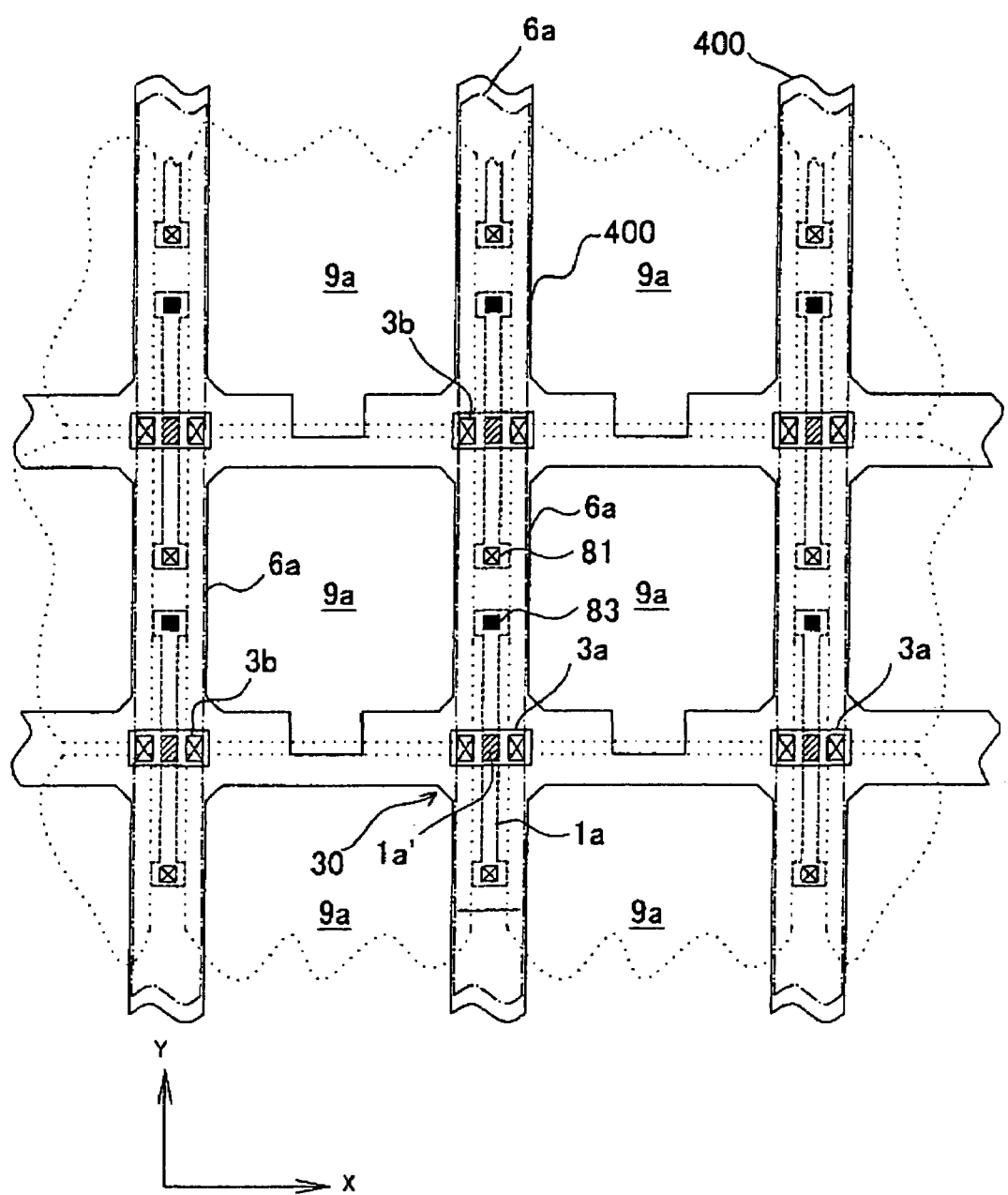
FIG. 8 is a plan view in which only the major parts are taken out in FIG. 2.
Figure 9:
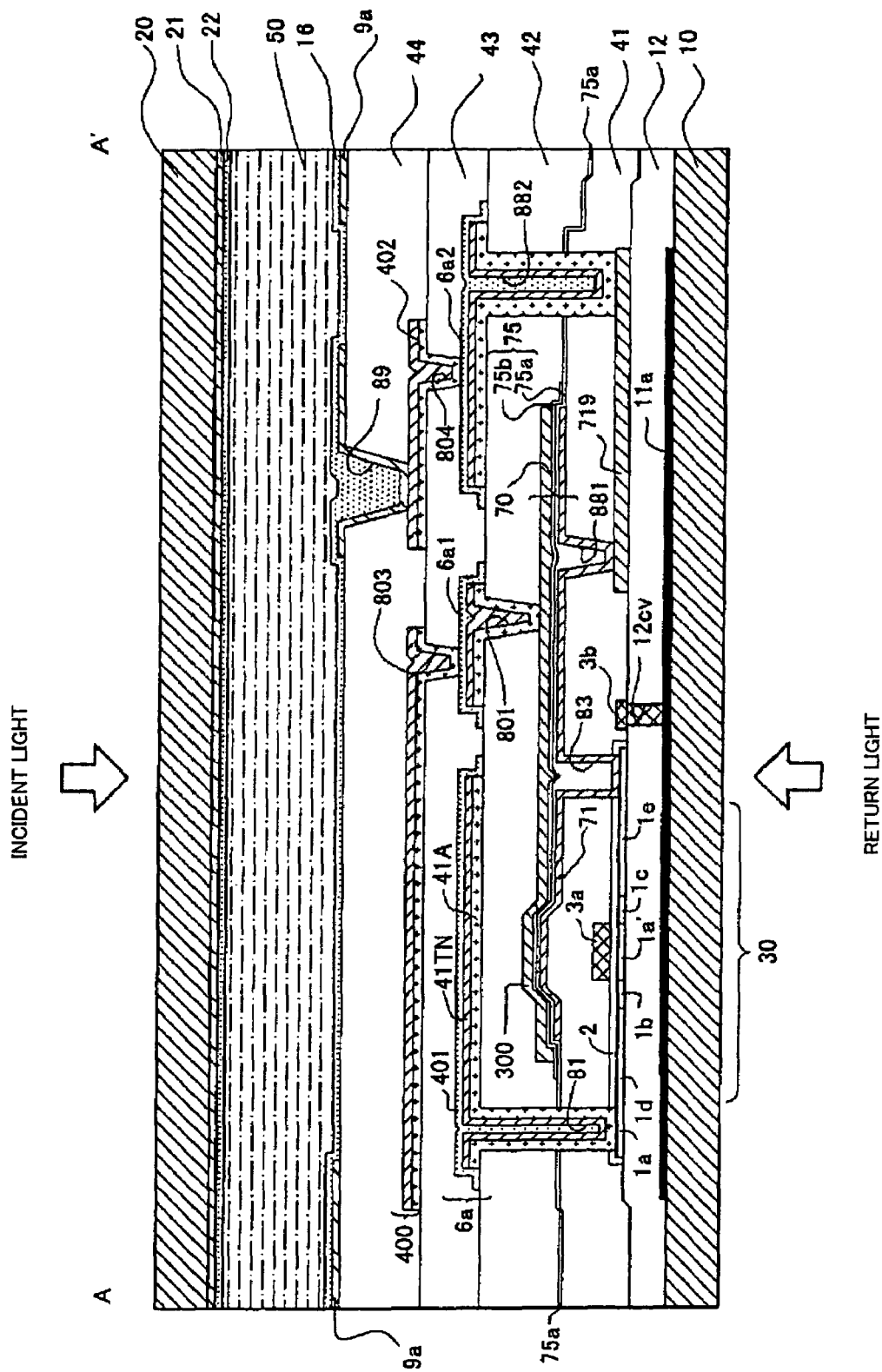
FIG. 9 is a cross-sectional view taken along a line A–A' shown in FIG. 2.

First, the construction of the pixel section of the electro-optical device related to the embodiment of the present invention will be explained with reference to FIG. 6 to FIG. 9. Here, FIG. 6 is an equivalent circuit of various elements, wiring, and the like in a plurality of pixels formed in a matrix and constructing an image display area of the electro-optical device. FIG. 7 is a plan view of a group of a plurality of pixels adjacent to each other of the TFT array substrate having formed thereon data lines, scanning lines, pixel electrodes and the like. Further, FIG. 8 is a plan view illustrating the arrangement of the major parts in FIG. 7, particularly, the data lines, the shielding layer and the pixel electrodes. FIG. 9 is a cross-sectional view taken along the line A–A' of FIG. 7. Further, in FIG. 9, each layer and each element have different scales, respectively, so that each layer and each element have a size capable of being recognized.

In FIG. 6, in the plurality of pixels formed in a matrix for constituting the image display region of the electro-optical device related to this embodiment, pixel electrodes 9a and TFTs 30 for controlling switching of the corresponding pixel electrode 9a are formed, and data lines 6a having supplied thereto image signals are electrically connected to the source of the corresponding TFT 30. A plurality of image signals S1, S2, . . . , and Sn to be written in data lines 6*a* may be supplied to each line sequentially in this order or may be supplied to each group, each group being consisted of a plurality of adjacent data lines 6*a*.

Further, gate electrodes are electrically connected to gates of the TFTs 30. It is configured that scanning signals G1, G2, . . . , and Gn are pulsatingly applied in a predetermined time to scanning lines 11*a* and the gate electrodes sequentially in this order. The pixel electrodes 9*a* are electrically connected to drains of the TFTs 30 and writes the image signals S1, S2, . . . , and Sn supplied from the data lines 6*a* in a predetermined time, by closing the TFT 30 as a switching element for a predetermined period of time.

A predetermined level of the image signals S1, S2, . . . , and Sn written in liquid crystal, as one example of the electro-optical material, through the pixel electrodes 9*a* are held between the pixel electrodes and counter electrodes formed on a counter substrate for a predetermined period of time. The liquid crystal changes the alignment or the order of an aggregate of molecules according to the voltage applied thereto, thereby modulating the light to allow gray scale display. If it is in a normally white mode, the transmittance for the incident light reduces in accordance with the voltage applied in units of pixels, while if it is in a normally black mode, the transmittance for the incident light increases in accordance with the voltage applied in units of pixels, whereby the light having a contrast according to image signals is emitted from the electro-optical device as a whole.

Here, in order to prevent the held image signals from leaking, storage capacitors 70 are added in parallel with liquid crystal capacitors formed between the pixel electrodes 9*a* and the counter electrodes. Each storage capacitor 70 is provided parallel to the scanning line 11*a* and includes a fixed-potential-side capacitor electrode and a capacitor electrode 300 fixed to electrostatic potential.

Hereinafter, a practical construction of the electro-optical device in which the circuit operation as described above is realized by the data lines 6*a*, the scanning lines 11*a* and the gate electrode 30, the TFTs 30 and the like will be described with reference to FIG. 7 to FIG. 9.

First, in FIG. 7, the pixel electrodes 9*a* are provided on the TFT array substrate 10 as an active matrix substrate in a matrix (the outline thereof is denoted by a dotted line), the data lines 6*a* and the scanning lines 11*a* are provided along vertical and horizontal boundaries of the pixel electrodes 9*a*. The data lines 6*a* have a laminated structure including an aluminum film and the like as will be described below, and the scanning lines 11*a* are made of, for example, a conductive polysilicon film. Further, the scanning lines 11*a* are electrically connected to gate electrodes 3*a* opposite to channel regions 1*a*' denoted by oblique lines ascending to the right side in the drawing, and the gate electrodes 3*a* are included in the scanning lines 11*a*. That is, the TFTs 30 for switching the pixels in which the gate electrodes 3*a* included in the scanning lines 11*a* are arranged to face the channel regions 1*a*' are provided at intersections between the gate electrodes 3*a* and the data lines 6*a*, respectively. In other words, the TFTs 30 (except for the gate electrodes) are located between the gate electrodes 3*a* and the scanning lines 11*a*.

Then, the electro-optical device, as shown in FIG. 9 which is a cross-sectional view taken along a line A–A' of FIG. 7, can include a TFT array substrate 10 made of, for example, a quarts substrate, a glass substrate, or a silicon substrate, and a counter substrate 20 arranged to face the array substrate and made of a glass substrate or a quartz substrate.

At the TFT array substrate 10, as shown in FIG. 9, a pixel electrode 9*a* is provided, and an alignment film 16 subject to a predetermined alignment treatment, such as a rubbing treatment is formed on the upper side of the TFT array substrate 10. The pixel electrode 9*a* is made of, for example, a transparent conductive film, such as an ITO film. On the other hand, at the counter substrate 20, a counter electrode 21 is provided on the overall surface thereof, and at the bottom side, an alignment film 22 subject to a predetermined alignment treatment such as a rubbing treatment is provided. The counter electrode 21 among these is made of, for example, a transparent conductive film, such as an ITO film, similar to the above described pixel electrode 9*a*, and the alignment films 16 and 22 are made of, for example, a transparent organic film such as a polyimide film.

A liquid crystal layer 50 is formed by enclosing an electro-optical material, such as a liquid crystal, into a space surrounded by a sealing material (refer to FIG. 10 and FIG. 11), which will be described after, between the TFT array substrate 10 and the counter substrate 20 which are thus arranged to face each other. The liquid crystal layer 50 takes a predetermined alignment state by the alignment films 16 and 22 in the state when electric field is not applied thereto from the pixel electrode 9*a*. The liquid crystal layer 50 is made of, for example, an electro-optical material in which one type or several types of nematic liquid crystals are mixed. The sealing material is an adhesive made of, for example, a photo curable resin or a thermosetting resin to adhere the TFT substrate 10 and the counter substrate 20 to each other therearound. A spacer, such as glass fibers or glass beads, is mixed into sealing material to maintain a predetermined value of distance between the TFT array substrate 10 and the counter substrate 20.

On the other hand, on the TFT array substrate 10, the plurality of pixel electrodes 9*a* and the alignment film 16 and the other elements form a laminated structure. The laminated structure, as shown in FIG. 9, in order from the bottom, can include a first layer including the scanning lines 11*a*, a second layer including the TFT 30 having the gate electrode 3*a*, a third layer including the storage capacitor 70, a fourth layer including the data lines 6*a*, a fifth layer including the shielding layer 400 and a sixth layer (an uppermost layer) including the pixel electrodes 9*a* and the alignment film 16. Further, a base insulating film 12 is provided between the first layer and the second layer, a first interlayer insulating film 41 is provided between the second layer and the third layer, a second interlayer insulating film 42 is provided between the third layer and the fourth layer, a third interlayer insulating film 43 is provided between the fourth layer and the fifth layer, and a fourth interlayer insulating film 44 is provided between the fifth layer and the sixth layer, respectively, thereby preventing the above described elements from shorting each other. Moreover, in the various insulating films 12, 41, 42, 43 and 44, for example, an element such as a contact hole for electrically connecting a high concentration source region 1*d* in a semiconductor layer 1*a* of the TFT 30 and the data line 6*a* is also provided. Hereinafter, the respective elements will be explained in order from the bottom.

First, the first layer is provided with a scanning line 11*a* made of, for example, a metal monomer, an alloy, a metal silicide, and a poly silicide including at least one of the metals having a high melting point such as titanium (Ti), chrome (Cr), tungsten (W), tantalum (Ta), molybdenum (Mo), a laminate of these materials, a conductive polysilicon, and the like. The scanning line 11a is patterned in a stripe shape along an X direction in FIG. 7, as seen in plan view. More specifically, the stripe-shaped scanning line 11a is provided with a main line part extending along the X direction in FIG. 7, and a protrusion part extending along a Y direction in FIG. 7 along which the data line 6a and the shielding layer 40 extend. Further, the protrusion parts extending from the adjacent scanning lines 11a are not connected to each other. Accordingly, the scanning lines 11a are in the form divided one by one.

According to this, the scanning line 11a has a function of controlling ON/OFF all of the TFTs 30, which exists on the same row. Further, since the scanning line 11a is formed to bury a region in which the pixel electrode 9a is not formed, it has a function of shielding the light incident from the bottom side of the TFT 30. As a result, it is possible to prevent the occurrence of optical leakage current in the semiconductor layer 1a of the TFT 30 and it is possible to display a high-quality image with no flicker.

Next, the TFT 30 including the gate electrode 3a is provided as the second layer. The TFT 30, as shown in FIG. 9, has a lightly doped drain (LDD) structure. The TFT 30 includes, as the elements thereof, the above described gate electrode 3a, a channel region 1a' of the semiconductor layer 1a made of, for example, a polysilicon film and having formed thereon a channel by an electrical field from the gate electrode 3a, an insulating film 2 including the gate insulating film for insulating the gate electrode 3a and the semiconductor layer 1a, and a low concentration source region 1b and a low concentration drain region 1c, and a high concentration source region 1d and a high concentration drain region 1e, in the semiconductor layer 1a.

In this embodiment, in particular, a relay electrode 719 is formed in the second layer using the same film as the above described gate electrode 3a. The relay electrode 719, as shown in FIG. 7, is formed in an island shape in such a way that it is located substantially at the center of one side of each pixel electrode 9a, as seen in plan view. The relay electrode 719 and the gate electrode 3a are formed using the same film. For this reason, if the gate electrode 3a is made of a conductive polysilicon film, the relay electrode 719 is also made of a conductive polysilicon film.

Moreover, although the above described TFT 30 preferably has the LDD structure as shown in FIG. 9, it should be understood that the TFT 30 may have an offset structure in which impurities are not implanted into the low concentration source region 1b and the low concentration drain region 1c, or the TFT 30 may be a self-alignment type TFT for implanting a high concentration of impurities using the gate electrode 3a as a mask and forming a high concentration source region and a high concentration drain region in a self-aligned manner. Further, although this embodiment employs a single gate structure in which only one gate electrode of the pixel switching TFT 30 is arranged between the high concentration source region 1d and the high concentration drain region 1e, it should be understood that at least two gate electrodes may be arranged between the high concentration source region 1d and the high concentration drain region 1e. If the TFT is constructed with a dual gate, a triple gate, or a larger number of gates, it is possible to prevent the leakage of current at a junction between the channel and source regions, thereby preventing the current during turning-off from being reduced.

Furthermore, the semiconductor layer 1a constituting the TFT 30 may be a non-single crystal layer or a single crystal layer. The single crystal layer can be formed using a known junction method. By making the semiconductor layer 1a as a single crystal layer, the high performance of, in particular, the peripheral circuit can be achieved.

On the scanning line 11a as described above and below the TFT 30, the base insulating film 12 made of, for example, a silicon oxide film is provided. The base insulating film 12 has a function of interlayer insulating the TFT 30 from the scanning lines 11a as well as a function of preventing the change of characteristics of the pixel switching TFT 30 due to the roughness during the surface polishing of the TFT array substrate 10 or due to stains left after the cleaning, by forming the base insulating film 12 on the entire surface of the TFT array substrate 10.

In the base insulating film 12, as seen in plan view, a groove (a contact hole) 12cv having the width equal to the channel length of the semiconductor layer 1a extending along the data line 6a, which will be described below, is cut out in both wings of the semiconductor layer 1a. Correspondingly to the groove 12cv, the gate electrode 3a laminated on the groove 12cv includes a portion formed in a concave shape at the lower side thereof. Further, the gate electrode 3a is formed to bury the whole groove 12cv, so that a sidewall portion 3b formed integrally with the gate electrode 3a extends along the gate electrode 3a. As a result, the semiconductor layer 1a of the TFT 30, as clearly shown in FIG. 7, is covered from its lateral side as seen in plan view, and the incidence of light at least from this portion is suppressed.

Also, this sidewall portion 3b is formed to bury the groove 12cv and the lower end thereof contacts the scanning line 11a. Here, the scanning line 11a is formed in a stripe shape as described above. As a result, a gate electrode 3a and a scanning line 11a in a row have the same potential, if only paying attention to the corresponding row.

Here, in the present invention, in parallel to the scanning line 11a parallel, a structure forming another scanning line including the gate electrode 3a may be employed. In this case, the scanning line 11a and the other scanning lines take a redundant wiring structure. As a result, for example, in case that a normal application of electrical current is impossible due to any defect existing at the portion of the scanning lines 11a, if the corresponding scanning line 11a and the other scanning lines existing on the same row are normal state, the operational control of the TFT 30 can be implemented through the remaining normal scanning lines, still normally.

However, in the third layer subsequent to the second layer as described above, a storage capacitor 70 is provided. The storage capacitor 70 is formed by arranging a lower electrode 71 as a pixel-potential-side capacitor electrode connected to the high concentration drain region 1e and the pixel electrode 9a of the TFT 30 and the capacitor electrode 300 as the fixed-potential-side capacitor electrode to face each other via the dielectric film 75. According to this storage capacitor 70, the voltage holding characteristics in the pixel electrode 9a can be improved drastically. Further, since the storage capacitor 70 related to this embodiment, as can be understood from the plan view of FIG. 7, does not reach an optical transmission region substantially corresponding to the formation region of the pixel electrode 9a (in other words, since the storage capacitor 70 is formed within the blinding area), the overall pixel aperture ratio of the electro-optical device is kept relatively large, thereby allowing the electro-optical device to display brighter image.

More specifically, the lower electrode 71 made of, for example, a conductive polysilicon film, serves as a pixel-potential-side capacitor electrode. However, the lower electrode 71 may be constructed with a single layer thin film or a multi-layer thin film including a metal or an alloy. Further, the lower electrode 71 has a function as a pixel-potential-side capacitor electrode as well as a function of relay-connecting the pixel electrode 9a and the high concentration drain region 1e of the TFT 30. Also, in particular, in this embodiment, the relay connection described here is characterized in that it is implemented via the relay electrode 719. This point will be again explained in detail below.

The capacitor electrode 300 serves as a fixed-potential-side capacitor electrode of the storage capacitor 70. In this embodiment, in order to make the capacitor electrode 300 have the fixed potential, electrical connection with the shielding layer 400 having the fixed potential is achieved.

In this embodiment, in particular, on the TFT array substrate 10, the capacitor electrode 300 is formed in an island shape corresponding to each of the pixels, and the lower electrode 71 is formed in substantially the same shape as that of the corresponding capacitor electrode 300.

As a result, the storage capacitor 70 related to this embodiment does not have an undesired extension in a plane, that is, does not deteriorate the pixel aperture ratio, and can realize the maximum capacity value under the corresponding circumstance. That is, in this embodiment, the storage capacitor 70 becomes smaller and has a larger capacity value.

More specifically, in FIG. 9, the area of the capacitor electrode 300 is slightly larger than that of the lower electrode 71, that is, as the capacitor electrode 300 is formed so as to cover the lower electrode 71. By this shape, as shown in the drawing, since the side surface of the capacitor electrode 300 and the lower electrode 71 thereof can be used as a capacitor (refer to the left side of the storage capacitive 70 in FIG. 9), the present invention can increase the capacity value. Further, it is very difficult to short-circuit between both. Further, from this viewpoint, in order to increase the area of the side surface, for example, it is effective that the lower electrode 71 is previously made relatively thick.

Further, the capacitor electrode 300, for example, is allowable that it has a dual layer structure laminated with a WSi layer and a polysilicon layer in order from the top layer. According to the dual layer structure, the optical shielding property for the TFT 30 can be improved due to the presence of the WSi layer, thereby to obtain an excellent electrical conductivity. Further, the capacitor electrode 300 has a dual layer structure consisting of an aluminum layer and a polysilicon layer laminated in order from the top layer or has a multi-layer structure, consisting of a plurality of dual layers of a WSi layer and a titanium layer laminated in order from the top layer and finally a polysilicon layer laminated at the bottom.

The dielectric film 75, as shown in FIG. 9, includes a high temperature oxide (HTO) film with a relatively thin thickness of for example, 5 to 200 nm, a silicon oxide film, such as a low temperature oxide (LTO) film or a silicon nitride film and the like. From the viewpoint of increasing the storage capacitor 70, as far as sufficient reliability of thin film can be obtained, the thinner the dielectric film 75 becomes, the better. Also, in this embodiment, in particular, the dielectric film 75, as shown in FIG. 9, has a dual layer structure including a silicon oxide film 75a as a bottom layer and a silicon nitride film 75b as a top layer. The nitride silicon film of the top layer among these layers is formed in order to introduce into the blinding area (non-path region) by being patterned into a predetermined size slightly larger than the lower electrode 71 of the pixel-potential-side capacitor electrode. According to this, since the silicon nitride layer 75b having a relatively large dielectric constant exists, the capacity value of the storage capacitor 70 can be increased, in addition, however, since the silicon oxide film 75a exists, the voltage-proof property of the storage capacitor 70 is not decreased.

As a result, by constructing the dielectric film 75 with a dual layer structure, two incompatible operational effects can be enjoyed. Further, since the silicon nitride film 75b exists, the waterproof for the TFT 30 can be prevented previously. As the result, in this embodiment, the threshold voltage does not increase in the TFT 30, thereby allowing the device to be operated during a relatively long period. Further, the silicon nitride 75b having pigmentation is not formed on the portion that does not transmit the light beam (placing in the blind area) by being patterned into a predetermined size slightly larger than the lower electrode 71, thereby preventing the deterioration of the transmittance. Further, in this embodiment, although the dielectric film 75 has a dual layer structure, according to circumstances, for example, a triple layer structure including a silicon oxide film, a silicon nitride film and a silicon oxide film or a laminated structure having more layers may be employed.

On the TFT 30 to the gate electrode 3a and the relay electrode 719 described above and below the storage capacitor 70, first interlayer insulating film 41 made of, for example, a silicate glass film such as non silicate glass (NSG), phosphor silicate glass (PSG), boron silicate glass (BSG), boron phosphorous silicate glass (BPSG), a nitride silicon film or a silicon oxide film or preferably NSG, is formed. Also, in the first interlayer insulating film 41, a contact hole 81, electrically connecting the high concentration source region 1d of the TFT 30 to the data lines 6a to be described below, is formed while passing through a second interlayer insulating film 42 to be described later. Further, in the first interlayer insulating film 41, the contact hole 83, electrically connecting the high concentration drain region 1e of the TFT 30 to the lower electrode 71 constituting the storage capacitor 70, is formed.

Further, in the first interlayer insulating film 41, a contact hole 881 for electrically connecting the lower electrode 71 as the pixel-potential-side capacitor electrode constituting the storage capacitor 70 and the relay electrode 719 is formed. Further, in addition, in the first interlayer insulating film 41, the contact hole 882 for electrically connecting the relay electrode 719 and the second relay electrode 6a2 to be described later is formed while passing through the second interlayer insulating film to be described later.

Further, among these four contact holes, in the forming portions of the contact holes 81 and 882, the above described dielectric film 75 is not formed, in other words, the opening portion is formed on the dielectric film 75. This is because, as to the contact hole 81, the electrical conduction between the high concentration source region 1d and the data line 6a needs to be made, and as to the contact hole 882, the first and the second interlayer insulating films 41 and 42 are made to penetrate the contact hole 882. In addition, if such opening portions are formed on the dielectric film 75, in case that a hydrogenation process is performed for the semiconductor layer 1a, the hydrogen used for the process can be easily reached the semiconductor layer 1a through the opening portions.

Further, in this embodiment, for the first interlayer insulating film 41, the activation of ions injected into the polysilicon film constituting the semiconductor layer 1a or the gate electrode 3a may be facilitated by performing the annealing at a temperature of about 1000° C.

However, in the fourth layer subsequent to the third layer described above, the data lines 6a are provided. This data line 6a extends along the semiconductor layer 1a of the TFT 30, that is, formed in a stripe shape so as to overlap in the Y direction in FIG. 7. This data lines 6a, as shown in FIG. 9, is composed of triple layer structure provided with a layer made of aluminum (refer to reference numeral 41A in FIG. 9), a layer made of nitride titanium (refer to reference numeral 41TN in FIG. 9), a layer made of silicon nitride (refer to reference numeral 401 in FIG. 9) in order from the bottom layer. The silicon nitride layer is patterned into a predetermined slightly large size so as to cover the aluminum layer and the nitride titanium layer below the silicon nitride layer. The data line 6a among these, by including aluminum as a material having relatively low resistance, smoothly implements the supply of image signal to the TFT 30 and the pixel electrodes 9a. On the other hand, the existence of the silicon nitride film having a relatively excellent function to prevent the penetration of moisture on the data lines 6a realizes the improvement of the waterproof property and a long lifetime of the TFT 30. It is preferable that the silicon nitride film is a plasma nitride silicon film.

Further, in the fourth layer, a relay layer 6a1 for a shielding layer and a second shielding electrode 6a2 are formed as the same film as the data line 6a. These, as seen in plan view as shown in FIG. 7, are not formed in a planar shape continuous with the data line 6a, but are formed discontinuously in patterning between both layers. That is, paying attention to the data line 6a located at the most left side in FIG. 7, the relay layer 6a1 for the shielding layer having almost in the form of substantially quadrangle at the immediately right side of the data lines 6a and the second relay electrode 6a2 in the form of substantially quadrangle having an area slightly larger than the relay layer 6a1 for the shielding layer at the further right side thereof are formed. The relay layer 6a1 for the shielding layer and the second relay electrode 6a2 are formed by using the same process of the data lines 6a, and formed by a triple layer structure including a layer made of aluminum, a layer made of nitride titanium and a layer made of silicon nitride. Also, the nitride silicon film is patterned into a predetermined configuration having a slightly large size so as to cover the aluminum layer and the nitride titanium layer formed below the nitride silicon layer. The nitride titanium layer serves as a barrier metal for preventing the contact holes 803 and 804 formed to the relay layer 6a1 for the shielding layer and the second relay layer 6a2 from etching therethrough. Further, by forming the nitride silicon film having a relatively excellent waterproof function to prevent the moisture from penetrating thereinto, on the relay layer 6a1 for the shielding layer and the second relay layer 6a2, the improved waterproof property and the long lifetime of the TFT 30 are realized. Further, it is preferable that the nitride silicon film is made of a plasma nitride silicon film.

On the storage capacitor 70 as described above, and below the data lines 6a, the second interlayer insulating films 42 are formed of a material, for example, made of a silicate glass film, such as NSG, PSG, BSG, BPSG, a silicon nitride film or a silicon oxide film, or preferably a material formed by a plasma chemical vapor deposition (CVD) method by using the TEOS gas. In the second interlayer insulating film 42, the contact hole 81 is formed for electrically connecting the high concentration source region 1d of the TFT 30 and the data lines 6a, and the contact hole 801 is formed for electrically connecting the relay layer 6a1 for the shielding layer and the capacitor electrode 300 as the upper electrode of the storage capacitor 70. Further, in the second interlayer insulating film 42, the contact hole 882 is formed in order to electrically connect the second relay electrode 6a2 and the relay electrode 719.

However, the fifth layer subsequent to the fourth layer described above, the shielding layer 400 is formed. The shielding layer 400, as seen in plan view, as shown in FIG. 7 and FIG. 8, is formed in the shape of lattice as they are extending along the X direction and the Y direction, respectively. The portion extending along the Y direction in the drawing of the shielding layer 400, in particular, is formed widely in comparison with the data lines 6a so as to cover the data lines 6a. Further, the portion extending along the X direction in the drawing has a notch portion at the central portion of one side of each of the pixel electrodes 9a in order to secure the area for forming the third relay electrode 402 to be described later.

Further, in FIG. 7 or FIG. 8, in the corner region of the portion of the shielding layer 400 crossing the portion extending along the X direction and the portion extending along the Y direction each other, a portion in the form of almost triangle is formed so as to bury the corner region. In the shielding layer 400, by forming the portion in the form of almost triangle, the shield of the light beam for the semiconductor layer 1a of the TFT 30 is effectively performed. That is, the light beam incident onto the semiconductor layer 1a at an angle does not reach the semiconductor layer 1a by being reflected or absorbed at the portion of triangular shape. Therefore, the creation of the optical leakage current is suppressed and it is allowable that the high quality of image is displayed without having a defect, such as a flicker.

The shielding layer 400 is provided extending from the image display region 10a in which the pixel electrode 9a is arranged to the neighboring area thereof, and is electrically connected to the static voltage source, thereby having a fixed potential. Further, the static voltage source may be that with a positive power or a negative power supplied to the data driving circuit 101 and may be that supplied to the counter electrode 21 of the counter substrate 20.

Like this, since the shielding layer 400 is formed so as to cover the entire surface of the data lines 6a (refer to FIG. 8), further the shielding layer 400 exists as a fixed potential, it is possible that the effect of capacitive coupling generated between the data lines 6a and the pixel electrodes 9a can be excluded. That is, it is possible that the change of the voltage of the pixel electrodes 9a according to the application of the electrical charge to the data lines 6a is previously avoided, whereby the probability to generate the nonuniformity of display in response to the data lines 6a can be reduced. In this embodiment, particularly, since the shielding layer 400 is formed in the shape of lattice, the undesired capacitive coupling can be suppressed also for the portion extending the scanning line 11a.

Further, in the fourth layer, a third relay electrode 402 as one example of the relay layer described in the present invention is formed as the same film as such shielding layer 400. The third relay electrode 402, through a contact hole 89 to be described below, has a function of relaying the electrical connection between the second relay electrodes 6a2 and the pixel electrodes 9a. Further, the shielding layer 400 and the third relay electrodes 402 are not formed continuously in a plane shape, but formed discontinuously between the shielding layer 400 and the third relay electrodes 402 from the viewpoint of patterning.

Meanwhile, the above described shielding layer 400 and the third relay electrode 402 have a dual layer structure including a layer made of aluminum at a bottom layer and a layer made of nitride titanium at the top layer. Further, in the third relay electrode 402, the bottom layer made of aluminum is connected to the second relay electrode 6$a$2, and the top layer made of nitride titanium is connected to the pixel electrodes 9$a$ made of a material such as ITO. In this case, particularly, the connection of the latter is performed excellently. To the contrary, if the aluminum is directly connected to the ITO, there occurs an electrical erosion between the aluminum and the ITO, therefore, the short-circuit of aluminum or insulation due to the formation of alumina is generated, thereby not realizing a preferable electrical connection. Like this, in this embodiment, since the electrical connection between the third relay electrode 402 and the pixel electrodes 9$a$ are performed excellently, it is possible that the application of voltage to the pixel electrodes 9$a$ or the voltage holding characteristics in the pixel electrodes 9$a$ are maintained well.

Further, since the shielding layer 400 and the third relay electrode 402 include aluminum having relatively excellent performance of optical reflection, and includes nitride titanium having relatively excellent performance of optical absorption, they can serve as a blind layer. That is, according to these, the traveling of incident light beam (refer to FIG. 9) to the semiconductor layer 1$a$ of the TFT 30 can be blocked at the upper side thereof. Further, as described previously for these things, it can be similarly said with regard to the above described capacitor electrode 300 and the data line 6$a$. In this embodiment, the shielding layer 400, the third relay electrode 402, the capacitor electrode 300 and the data lines 6$a$ are formed as a part of the laminated structure constructed on the TFT array substrate 10 and serve as the upper side blinding film (or the incorporated blinding film, if paying attention to the fact that it constitutes a part of the laminated structure) for shielding the incidence of the light beam from the upper side for the TFT 30. Further, according to the concept of the upper side blind film or the incorporated blind film, in addition to the above described structure, an element such as the gate electrode 3$a$ or the lower electrode 71 can be included thereinto. The gist, to interpret it most broadly, is that a structure made of an opaque material, constructed on the TFT array substrate 10, can be called as the upper side blind film or the incorporated blind film.

On the above described data line 6$a$, and below the shielding layer 400, the third interlayer insulating film 43 is formed of a silicate glass film consisting of NSG, PSG, BSG, BPSG and the like, a nitride silicon film, or a silicon oxide film or preferably formed by a plasma CVD method by using the TEOS gas. In the third interlayer insulating film 43, the contact hole 803 for electrically connecting the shielding layer 400 and the relay layer 6$a$1 for the shielding layer and the contact hole 804 for electrically connecting the third relay electrode 402 and the second relay electrode 6$a$2 are provided, respectively.

Further, for the second interlayer insulating film 42, by not performing such annealing as described above for the first interlayer insulating film 41, the reduction of the stress created in the vicinity of the interface of the capacitor electrode 300 may be realized.

Finally, in the sixth layer, as described above, the pixel electrode 9$a$ is formed in a matrix, and the alignment film 16 is formed on the pixel electrodes 9$a$. Also, below the pixel electrodes 9$a$, the fourth interlayer insulating film 44 is formed of a silicate glass film consisting of NSG, PSG, BSG, BPSG and the like, a nitride silicon film, a silicon oxide film or preferably BPSG. In the fourth interlayer insulating film 44, a contact hole 89 for electrically connecting the pixel electrodes 9$a$ and the third relay electrodes 402 is formed. Further, in this embodiment, particularly, the surface of the fourth interlayer insulating film 44 is planarized by a process such as a chemical mechanical polishing (CMP) and therefore, this planarized surface reduces the alignment error of the liquid crystal layer 50 due to the steps generated by the various wirings or the devices located below the planarized surface of the fourth interlayer insulating film 44. However, in place of planarizing the fourth interlayer insulating film 44 like this, a groove may be dug on at least one of the TFT array substrate 10, the base insulating film 12, the first interlayer insulating film 41, the second interlayer insulating film 42 and the third interlayer insulating film 43, and a plurality of wirings such as the data lines or the TFT 30 and the like are buried in the grooves to thereby realize the process of the planarization.

In the electro-optical device constructed by the above described structure related to this embodiment, particularly, there exists the relay electrodes 719 formed of the same film as the gate electrode 3$a$ of the second layer, and it is characterized in that the pixel electrodes 9$a$ located at the lower electrodes 71 of the storage capacitor 70 located at the third layer and at the sixth layer are electrically connected to the relay electrodes 719.

Like this, since the lower electrodes 71 and the pixel electrodes 9$a$ are connected through the relay electrodes 719 located at the further lower layer, viewed from each of the electrodes, the electrical connection point between the relay electrodes 719 and the lower electrodes 71, in particular, the electrical connection point, paying attention to the lower electrodes 71, is placed below the lower electrodes 71 (refer to the contact hole 881 in FIG. 9).

It should be noted that the wiring structure related to this embodiment described above is more practically and more specifically applied to such structure of the electro-optical device. That is, in the electro-optical device related to this embodiment, "the relay electrodes 719" correspond to "the relay layer 301" of the wiring structure of the present invention as described above, likewise, "the lower electrodes 71" correspond to the lower electrodes 203 and the pixel electrodes 9$a$ correspond to the conductive layer 101, respectively. Further, "the storage capacitor 70" corresponds to the capacitor 20C described above. Therefore, in accordance with the electro-optical device related to this embodiment, it is possible to obtain the same effect as that obtained by the wiring structure shown in FIG. 1.

That is, in accordance with the electro-optical device related to this embodiment, to electrically connect the storage capacitor 70 and the pixel electrodes 9$a$, a difficult process for etching only the capacitor electrodes 300 as a fixed-potential-side capacitor electrode constituting the storage capacitor 70 need not be performed, and the electrical connection between the storage capacitor 70 and the pixel electrodes 70$a$ is performed via the relay electrode 719, thereby realizing the electrical connection excellently.

Further, in the present invention, since the undesired process to etch only the above-described capacitor electrodes 300 need not be performed, the storage capacitor 70 is formed without having an undesired defect (for example, a defect such as a piercing in the lower electrode 71). Further, according to this embodiment, in case that any patterning is required to be performed for the storage capacitor, as a whole, it is allowable that the capacitor electrode 300, the dielectric film 75 and the lower electrode 719 are patterned at the same time.

Further, in this embodiment, although the same film as that of the gate electrodes 3$a$ forms the relay electrodes 719, the present invention is not limited thereto. For example, since in the above preferred embodiment, the storage capacitor 70 formed on the third layer can be formed on an upper layer under various circumstances, in this case, it is possible that the relay electrodes are formed on an upper layer in comparison with the gate electrodes 3a. Further, for the three-dimensional or two-dimensional layouts of each of the elements, it should be understood that the present invention is not limited to the shape and the forms described in the above embodiments. Therefore, the present invention can be modified with various shapes different to those in FIG. 6 to FIG. 9.

Further, as described above, although the storage capacitor 70 is formed with a triple layer structure made of the pixel-potential-side capacitor electrode, the dielectric film and the fixed-potential-side capacitor electrodes subsequently from the bottom side, under the circumstances, it may be constructed vice versa. For this case, for example, the pixel-potential-side capacitor electrodes as the upper electrodes are designed in such a way that they have an area larger than that of the fixed-potential-side capacitor electrodes; therefore, the former has the residual area for the latter in plan view, and it is preferable that a residual area is located corresponding to the position of forming the contact hole passing through the relay electrodes 719. As a result, the electrical connection between the relay electrodes 719 and the pixel-potential-side capacitor electrode is easily realized by introducing the contact hole.

Like this, it is possible that the pixel-potential-side capacitor electrode does not construct the lower electrode 71 in the storage capacitor 70, but it constructs the upper electrodes (refer to the above described preferred embodiment).

Figure 10:
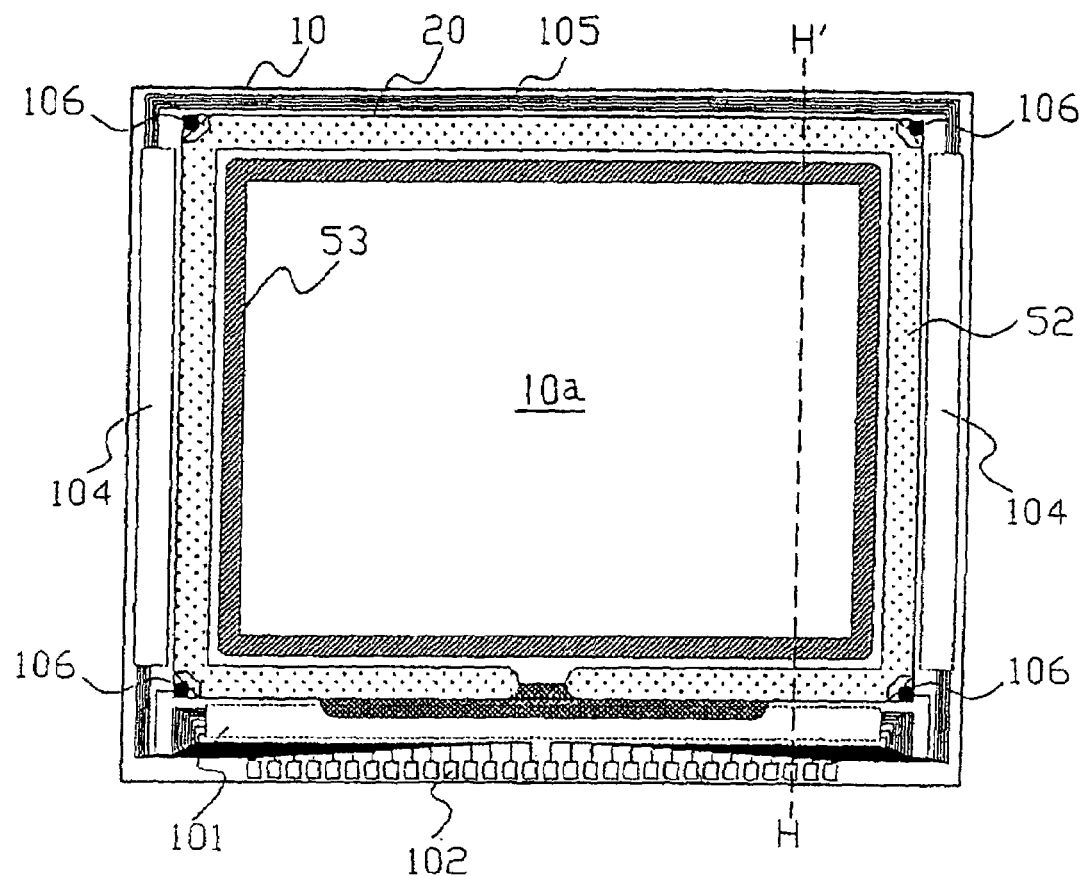
FIG. 10 is a plan view of the TFT array substrate in the electro-optical device according to the embodiment of the present invention together with various elements which are formed on the TFT array substrate, as seen from a counter substrate side.

Hereinafter, the overall construction of the electro-optical device related to this embodiment will be described with reference to FIG. 10 and FIG. 11. Further, FIG. 10 is a plan view seen from the side of the counter substrate 20 illustrating the TFT array substrate together with each of the elements formed on the TFR array substrate. Also, FIG. 11 is the cross-sectional view taken along a line H–H'.

Figure 11:
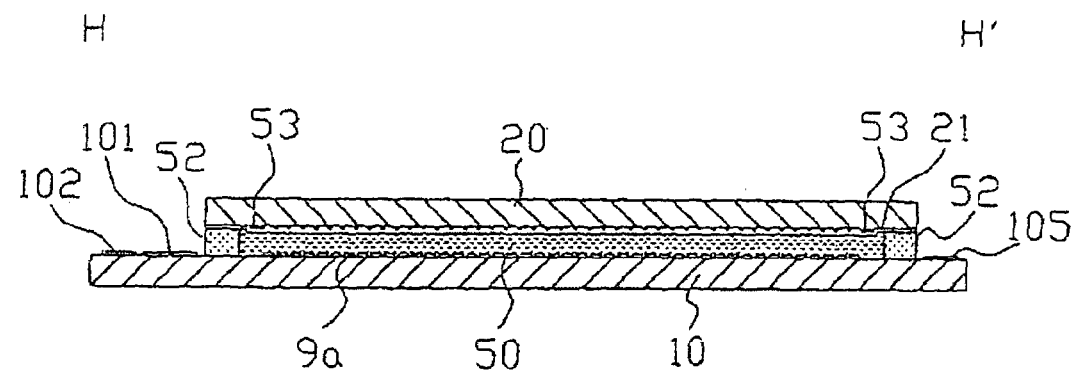
FIG. 11 is a cross-sectional view taken along a line H–H' shown in FIG. 10.

In FIG. 10 and FIG. 11, the electro-optical device related to this embodiment, the TFT array substrate 10 and the counter substrate 20 are arranged to face each other. A liquid crystal layer 50 is sealed between the TFT array substrate 10 and the counter substrate 20, and the TFT array substrate 10 and the counter substrate 20 are adhered with each other by a sealing material 52 provided in the sealing region located around the image display region 10a.

The sealing material 52 is formed of, for example, an ultraviolet curable resin, a thermosetting resin and the like for adhering both of the substrates, and can be solidified by irradiating the ultraviolet ray or by heating. Further, among the sealing materials 52, if the electro-optical device related to this embodiment is applied to the liquid crystal display device, such as a projector with a very small size for expanding the image to implement the display, in order to determine the distance (the gap between the substrates) between both of the substrates as a predetermined value, a gap material (spacer), such as glass fibers or glass beads can be coated therebetween. Or, if the corresponding electro-optical device is applied to a liquid crystal display device such as a liquid crystal display or a liquid crystal TV for displaying the image in an equal magnification in a large size, such gap material can be included into the liquid crystal layer 50.

At the external region of the sealing material 52, by supplying the image signal to the data lines 6a at a predetermined time, a data line driving circuit 101 for driving the data lines 6a and an external circuit connection terminal 102 are provided along one side of the TFT array substrate 10, and by supplying the scanning signal to the scanning line 11a and the gate electrode 3a at the predetermined time, a scanning-line driving circuit 104 for driving the gate electrode 3a is provided along a pair of sides adjacent to the one side of the TFT array substrate.

Further, if there is no delay problem of the scanning signal supplied to the scanning line 11a and the gate electrode 3a, the scanning-line driving circuit 104 may be provided along only one side.

Further, it is preferable that the data line driving circuit 101 may be arranged along the side of the image display region 10a.

In the remaining one side of the TFT array substrate 10, a plurality of wirings 105 are provided for connecting the gap of scanning-line driving circuit 104 provided on both sides of the image display region 10a. Further, in at least one portion of the corner part of the counter substrate 20, a conductive material 106 for electrically connecting the TFT array substrate 10 and the counter substrate 20 is provided.

In FIG. 11, on the TFT array substrate 10, after the TFT for pixel switching or a wiring such as a scanning line or a data line is formed, the alignment film is formed on the pixel electrodes 9a. On the other hand, on the counter substrate 20, except for the counter substrate 21, the alignment film is formed on the part of the most upper layer. Further, the liquid crystal layer 50 is made of, for example, an electro-optical material mixed one type or various types of nematic liquid crystals, and between the pair of alignment films, it is oriented at a predetermined state.

Further, on the TFT array substrate 10, in addition to these data line driving circuit 101 and the scanning-line driving circuit 104, it is possible that a sampling circuit for applying the image signal to a plurality of data lines 6a at a predetermined time, a precharge circuit for supplying a precharge signal having a predetermined voltage level to the plurality of data lines in advance of the image signal and a test circuit for testing the quality and defects of the corresponding electro-optical device during the manufacturing processes or during the freight of the manufactured products are formed.

Further, this embodiment is prepared, in place of installing the data line driving circuit 101 and the scanning-line driving circuit 104 on the TFT array substrate 10, both circuits may be electrically and mechanically connected to, for example, a driving LSI mounted on a tape automated bonding (TAB) substrate through anisotropic conductive film provided on the neighboring portion of the TFT array substrate 10. Further, At the counter substrate 20 on which the transmitted light beam impinges and at the TFT array substrate 10 from which the output light beam is output, respectively, a polarizing plate such as a polarizing film, a phase difference film and the like is arranged in a predetermined direction according to an operational mode, for example, a twisted nematic (TN) mode, a vertically aligned (VA) mode, a polymer dispersed liquid crystal (PDLC) mode and the like, or a normally white mode and a normally black mode, respectively.

The present invention is not limited to the above described preferred embodiments, but appropriate changes and modifications may be made without departing from the spirit and scope of the invention as defined in the above entire specification and the claims. Therefore, a wiring structure, a method for manufacturing the same and an electro-optical device accompanying with such changes, or, for example, an electrophoresis device, an electroluminescence display device and an electronic apparatus including these electro-optical devices are also within the scope of the present invention.

What is claimed is:

1. An electro-optical device comprising, on a substrate, data lines extending along a first direction, scanning lines extending along a second direction intersecting the data lines, and pixel electrodes and thin film transistors arranged to correspond to intersection regions between the data lines and the scanning lines, the electro-optical device further comprising:

storage capacitors that are electrically coupled to the thin film transistors and the pixel electrodes; and relay electrodes that are arranged below the pixel electrodes and the storage capacitors, respectively, one electrode of a pair of electrodes constituting each storage capacitor being electrically coupled to the pixel electrode through the relay electrode.

2. The electro-optical device according to claim 1, the storage capacitor being formed on a surface having a step.

3. The electro-optical device according to claim 1, the one electrode being a pixel-potential-side capacitor electrode electrically coupled to the pixel electrode and the thin film transistor, the storage capacitor comprising the pixel-potential-side capacitor electrode, a fixed-potential-side capacitor electrode arranged to face the pixel-potential-side capacitor electrode and having a fixed potential, and a dielectric film interposed between the pixel-potential-side capacitor electrode and the fixed-potential-side capacitor electrode; and the dielectric film comprising a laminate including a layer made of a high dielectric material.

4. The electro-optical device according to claim 1, the relay electrodes being formed using a same material as the gate electrodes of the thin film transistors included in the scanning lines.

5. The electro-optical device according to claim 1, the fixed-potential-side capacitor electrode being formed to cover the pixel-potential-side capacitor electrode.

6. An electronic apparatus utilizing an electro-optical device according to claim 1.

* * * * *